United States Patent
Shimizu et al.

(10) Patent No.: US 8,467,018 B2
(45) Date of Patent: Jun. 18, 2013

(54) COLOR FILTER AND LIQUID CRYSTAL DISPLAY DEVICE

(75) Inventors: Mie Shimizu, Tokyo (JP); Koichi Minato, Tokyo (JP); Yasuhiro Hibayashi, Tokyo (JP); Sohei Kadota, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 104 days.

(21) Appl. No.: 12/929,136

(22) Filed: Jan. 3, 2011

(65) Prior Publication Data

US 2011/0096274 A1    Apr. 28, 2011

Related U.S. Application Data

(63) Continuation of application No. PCT/JP2009/061116, filed on Jun. 18, 2009.

(30) Foreign Application Priority Data

Jul. 4, 2008    (JP) .................................. 2008-175606

(51) Int. Cl.
    *G02F 1/1335*    (2006.01)
(52) U.S. Cl.
    USPC .......................................... 349/106; 349/117
(58) Field of Classification Search
    None
    See application file for complete search history.

(56) References Cited

U.S. PATENT DOCUMENTS

| | | | |
|---|---|---|---|
| 2004/0032546 A1* | 2/2004 | Ito | 349/96 |
| 2006/0092350 A1* | 5/2006 | Nishkoji et al. | 349/106 |
| 2006/0098316 A1 | 5/2006 | Tatsuzawa et al. | |
| 2007/0159581 A1 | 7/2007 | Moriya | |
| 2008/0143935 A1* | 6/2008 | Akao et al. | 349/106 |
| 2009/0096966 A1* | 4/2009 | Umemoto et al. | 349/106 |
| 2009/0284697 A1* | 11/2009 | Asahi et al. | 349/106 |

FOREIGN PATENT DOCUMENTS

| | | |
|---|---|---|
| CN | 100347596 C | 11/2007 |
| JP | 2000-136253 | 5/2000 |
| JP | 2000-187114 | 7/2000 |
| JP | 2001-242460 | 9/2001 |
| JP | 2004-70342 | 3/2004 |
| JP | 2006-78647 | 3/2006 |
| JP | 2006-126419 | 5/2006 |
| JP | 2007-183600 | 7/2007 |
| JP | 2007-212603 | 8/2007 |
| JP | 2007-328324 | 12/2007 |
| JP | 2009-181070 | 8/2009 |

OTHER PUBLICATIONS

International Search Report for PCT/JP2009/061116, mailed Sep. 8, 2009.

(Continued)

*Primary Examiner* — Wen-Ying P Chen

(57) ABSTRACT

Disclosed is a liquid crystal display device including a liquid crystal cell provided with a color filter, a pair of polarizing plates arranged on both outside surfaces of the liquid crystal cell, and an optical compensation layer disposed inside of each polarizing plate, wherein, when a chromaticity (u, v) represented in CIE1960 color system is measured in a black state of the liquid crystal display device, a color difference $\Delta uv$ given by equation (1) described below is 0.02 or less in an range of $0 < \theta \leq 60$:

$$\Delta uv = [\{u(\perp)-u(\theta)\}^2 + \{v(\perp)-v(\theta)\}^2]^{1/2} \quad (1)$$

wherein $(u(\perp), v(\perp))$ is chromaticity as viewed from a vertical direction and $(u(\theta), v(\theta))$ is chromaticity as viewed from a direction inclined at an angle of $\theta$ degrees with a direction of a normal line of a display surface.

5 Claims, 2 Drawing Sheets

OTHER PUBLICATIONS

Chinese Office Action dated Nov. 3, 2011 issued in corresponding Chinese Patent Application No. 200980125778.2.

Japanese Office Action for corresponding Japanese application No. 2010-518988 issued Jan. 8, 2013.

* cited by examiner

COLOR FILTER AND LIQUID CRYSTAL DISPLAY DEVICE

CROSS REFERENCE TO RELATED APPLICATIONS

This is a Continuation application of PCT Application No. PCT/JP2009/061116, filed Jun. 18, 2009, which was published under PCT Article 21(2) in Japanese.

This application is based upon and claims the benefit of priority from prior Japanese Patent Application No. 2008-175606, filed Jul. 4, 2008, the entire contents of which are incorporated herein by reference.

BACKGROUND OF THE INVENTION

1. Field of the Invention

The present invention relates to a color filter for a liquid crystal display device having a good visibility from an oblique direction and from a vertical direction, and to a liquid crystal display device provided with the color filter.

2. Description of the Related Art

Liquid crystal display devices are those utilizing birefringence of a liquid crystal molecule and includes a liquid crystal cell, a polarizing element and an optical compensation layer. Liquid crystal devices like this are classified by the type of light source into two categories, that is, a transmission type device provided with a built-in light source and a reflection type device utilizing an external light source.

The transmission type liquid crystal display device has a structure in which two polarizing elements are arranged on both sides of the liquid crystal cell and one or two optical compensation layers are disposed between the liquid crystal cell and the polarizing element. Also, the reflection type liquid crystal display device has a structure in which a reflecting plate, a liquid crystal cell, one optical compensation layer and one polarizing element are arranged in this order.

In the liquid crystal cell, aligned rod-like liquid crystalline molecules are interposed between two substrates and a voltage is applied to an electrode layer disposed on one or both sides of two substrates to thereby vary the alignment state of the rod-like liquid crystal molecules, thereby switching on or off the transmission/shielding of light.

Liquid crystal cells having various display modes are proposed according to different alignment states of the rod-like liquid crystalline molecule. These liquid crystal cells includes TN (Twisted Nematic), IPS (In-Plane Switching), FFS (Fringe Field Switching), FLC (Ferroelectric Liquid Crystal), OCB (Optically Compensated Bend), STN (Supper Twisted Nematic), VA (Vertically Aligned) and HAN (Hybrid Aligned Nematic).

The polarizing element generally has a structure in which two transparent protective films including triacetyl cellulose (hereinafter referred to as "TAC") are applied to each side of the polarizing film obtained by diffusing iodine in a polyvinyl alcohol (hereinafter referred to as "PVA") and by stretching the film.

Various types are proposed as the compensation layer. For example, in a VA-mode liquid crystal display device having good display characteristics in a wide range of viewing angles, a biaxial retardation film having an index ellipsoid having the following relation between three-dimensional principal indices $n_x$, $n_y$ and $n_z$: $n_x \geq n_y > n_z$ is combined (see, for example, JP-A 2007-328324).

A liquid crystal display device is valued for its space saving and light-weight characteristics owing to its thin form, and also because it saves power, thus has rapidly become widely used in televisions and other AV equipment and also, on the other hand, it is strongly desired that the liquid crystal display device is more developed in display performances such as luminance, contrast and omnidirectional visibility.

Specifically, normally black mode IPSs and VA liquid crystal display devices enabling higher contrast and wide-viewing angle display are particularly preferably used in television applications. Also, as the optical compensation layer mentioned above, those so-designed that coloring as viewed from the front when displaying black and a variation in color as viewed from the front are minimized are used.

However, most of the optical compensation layers to be used in the aforementioned VA mode liquid crystal display device are generally biaxial retardation films formed by biaxial alignment or retardation films formed by applying a polymerizable liquid crystalline and/or non-polymerizable liquid crystalline material. It is therefore difficult to produce these retardations films having three-dimensional refractive indices $n_x$, $n_y$ and $n_z$ controlled at the high level of display quality required these days.

Specifically, it is necessary that the three-dimensional principal refractive indices be determined in consideration of not only the birefringence of the liquid crystal material but also even the retardation values (hereinafter, referred to as Rth (R), Rth (G) and Rth (B)) in the directions of the film thicknesses of the red, green and blue color pixel layers constituting the color filter prior to the production of the compensation layer. However, it is difficult to control the in-plane retardation values represented by two parameters $n_x$ and $n_y$ and the retardation values represented by three parameters $n_x$, $n_y$ and $n_z$ in the thickness directions simultaneously with high accuracy and it is also difficult to provide the optical compensation layer with both the wavelength dispersibility compensating the birefringence of the liquid crystal material and the wavelength dispersibility compensating the retardation values in the thickness direction of each of the red, green and blue color pixel layers for light having wavelengths in red, green and blue regions. It cannot be said that current liquid crystal display devices are designed to have an optimum wavelength dispersibility.

As a result, though the visibility from the front (vertical direction) with respect to the display surface is better, optical compensation for visibility from an oblique direction at an angle of, for example, 45 degrees with respect to the front (vertical direction) (hereinafter simply abbreviated as "oblique visibility") is not optimally achieved, and therefore, only a specific color light leak, resultantly causing reddish, bluish or greenish coloring when black is displayed.

A color filter has a relatively small retardation compared to other members used in a liquid crystal display device. Therefore, in a conventional system liquid crystal display device, the compensation ability of the optical compensation layer is designed with almost no consideration given to the retardation of the color filter. However, the retardation level has come to be non-negligible in liquid crystal televisions requiring a high contrast and wide viewing angle characteristics.

In, particularly, liquid crystal display devices having a contrast as high as 1000 or more and especially 3000 or more, there is a high demand for the image qualities of black display, and this becomes a problem to be solved.

On the other hand, there is an attempt to reduce the retardation of a color filter by formulating a polymer having a plane structural group at its side chain in a color polymer thin film or by formulating birefringence-reducing particles having a reverse positive or negative birefringence with respect to the color polymer thin film (see, for example, JP-A 2000-136253 and 2000-187114).

Also, a method is disclosed in which the in-plane retardation of the blue region of a color filter is made to be larger than those of the green region and red region to thereby increase the leakage of blue light, thereby offsetting yellowing which has a complementary color relation with blue all over the display surface, to make an improvement in the yellowing of the whole display surface when viewing the liquid crystal display device from an oblique direction (see, for example, JP-A 2001-242460).

Also, a method is disclosed to improve the oblique visibility, wherein the retardation values Rth (R), Rth (G) and Rth (B) in the thickness directions of red, green and blue pixels of a color filter are so designed as to satisfy the equation Rth (R)>Rth (G)>Rth (B) or Rth (R)<Rth (G)<Rth (B) in accordance with each wavelength dispersibility of a liquid crystal material and retardation film (see, for example, JP-A 2007-212603).

However, the inventors of the present invention have found that the retardation value in the thickness direction of a color filter largely differs depending on the type of pigment to be used and also, the degree of retardation value in the thickness direction of is increased by micronizing or dispersing the pigment or by using a matrix resin (for example, acryl resins and card resins). These methods using polymer thin films or formulating birefringence-reducing particles fail to obtain sufficient effects and therefore, cannot solve the above problems.

Particularly, a color filter using, as its base material, a transparent resin typified by acryl resins improved in the dispersibility of organic pigments for use in a high contrast liquid crystal display device has a difficulty in improving oblique visibility while maintaining a high contrast value (preferably 1000 or more and more preferably 3000 or more) required for the color filter.

Additionally, a color filter having a small birefringence is simply an excellent one in conventional technologies. Though studies as to measures for improving the oblique visibility have been made, almost no study has been made as to measures for adjusting the optimum value of the retardation in the thickness direction of each color of the color filter to the level at which no problem is posed on display of black state in consideration of the wavelength dispersibility of the birefringence of the liquid crystal material and optical compensation layer, as a high contrast liquid crystal display device.

BRIEF SUMMARY OF THE INVENTION

The present invention has been made in the above situation and it is an object of the present invention to provide a liquid crystal display device which is free from coloring even if it is viewed from an oblique direction and which has good visibility from the front and also to provide a color filter for this liquid crystal display device.

According to a first embodiment of the present invention, there is provided a liquid crystal display device comprising: a liquid crystal cell provided with a color filter; a pair of polarizing plates arranged on both outside surfaces of the liquid crystal cell; and an optical compensation layer disposed inside of each polarizing plate, wherein, when a chromaticity (u, v) represented in CIE1960 color system is measured in a black state of the liquid crystal display device, a color difference $\Delta uv$ given by equation (1) described below is 0.02 or less in an range of $0<\theta\leq 60$:

$$\Delta uv = [\{u(\perp)-u(\theta)\}^2 + [\{v(\perp)-v(\theta)\}^2]^{1/2} \quad (1)$$

wherein $(u(\perp), v(\perp))$ is chromaticity as viewed from a vertical direction and $(u(\theta), v(\theta))$ is chromaticity as viewed from a direction inclined at an angle of $\theta$ degrees with a direction of a normal line of a display surface.

According to a second embodiment of the present invention, there is provided a color filter for the liquid crystal display device as described above, which comprises color pixels including at least a red pixel, a green pixel and a blue pixel, wherein a retardation value Rth (R) in a thickness direction of the red pixel, a retardation value Rth (G) in a thickness direction of the green pixel and a retardation value Rth (B) in a thickness direction of the blue pixel satisfy following equations (2) and (3):

$$Rth(G) \geq 0 \quad (2)$$

$$Rth(B) < Rth(G) > Rth(R) \quad (3)$$

wherein Rth (R), Rth (G) and Rth (B) are a product of a value obtained by subtracting a refractive index in the thickness direction from an average of an in-plane refractive index of each pixel and a thickness (nm) of the pixel, Rth (R) being a retardation value in the thickness direction with respect to a light at a wavelength of 610 nm passing through a red region, Rth (G) being a retardation value in the thickness direction with respect to a light at a wavelength of 545 nm passing through a green region, and Rth (B) being a retardation value in the thickness direction with respect to a light at a wavelength of 450 nm passing through a blue region.

DETAILED DESCRIPTION OF THE INVENTION

An embodiment of the present invention will be explained.

Figure 1:
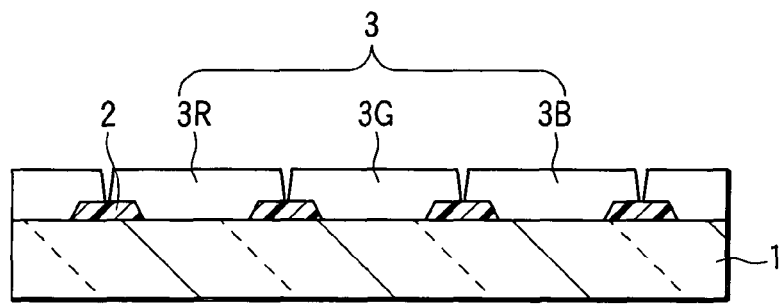
FIG. 1 is a schematic sectional view showing a color filter according to an embodiment of the present invention.

FIG. 1 is an example of the structure of a color filter for a liquid crystal display device according to a first embodiment of the present invention. In the color filter shown in FIG. 1, a black matrix 2 is formed on a glass substrate 1 and three color pixels: a red pixel 3R, a green pixel 3G and a blue pixel 3B are formed in respective regions partitioned by this matrix 2.

In this color filter, the retardation value Rth (R) in the thickness direction of the red pixel 3R, the retardation value Rth (G) in the thickness direction of the green pixel 3G and the retardation value Rth (B) in the thickness direction of the blue pixel 3B satisfy the following equations (2) and (3).

$$Rth(G) \geq 0 \quad (2)$$

$$Rth(B) < Rth(G) > Rth(R) \quad (3)$$

In the above formula, Rth (R), Rth (G) and Rth (B) are the product of a value obtained by subtracting the refractive index in the thickness direction from an average of the in-plane refractive index of each pixel and the thickness (nm) of the pixel. Rth (R) is the retardation value in the thickness direction for light at a wavelength of 610 nm passing through a red region, Rth (G) is the retardation value in the thickness direction for light at a wavelength of 545 nm passing through a green region and Rth (B) is the retardation value in the thickness direction for light at a wavelength of 450 nm passing through a blue region.

The retardation value in the thickness direction of each color pixel is obtained by applying light having a continuous wavelength including a transmission light peak wavelength in the visible range (for example, a wavelength range from 380 nm to 780 nm) from the front and from a plurality of inclined incidence angles to measure the three-dimensional refractive index by using a retardation measuring device such as a spectral ellipsometer.

The retardation is measured using light having a wavelength of 610 nm in the case of a red pixel, a wavelength of 545 nm in the case of a green pixel and a wavelength of 450 nm in the case of a blue pixel from at least two directions: from the front and from a direction at an incidence angle of 45 degrees, to obtain three-dimensional refractive indices Nx, Ny and Nz and then, each retardation value (Rth) in the thickness direction is calculated by the following equation (4).

$$Rth = \{(Nx+Ny)/2 - Nz\} \times d \quad (4)$$

In the formula, Nx is an in-plane refractive index in the direction of axis x of the color pixel layer, Ny is in-plane refractive index in the direction of axis y of the color pixel layer and Nz is in-plane refractive index in the thickness direction of the color pixel layer, with $Nx \geq Ny$, Nx being called the slow axis. d is the thickness (nm) of the color pixel layer.

When an object to be measured is a color filter at this time, the retardation value of a single color pixel layer can be found by measuring through a mask which is configured to transmit only a single color pixel layer of R, G or B.

Also, an approximate retardation value of a single color pixel layer may be estimated as a retardation value originated only from the red pixel in the case of, for example, light having a wavelength of 610 nm being used as incident light, as a retardation value originated only from the green pixel in the case of, for example, light having a wavelength of 545 nm being used as incident light, and as a retardation value originated only from the blue pixel in the case of, for example, light having a wavelength of 450 nm being used as incident light.

In this case, when the object to be measured is a single color pixel layer of any one of R, G and B (structure in which a coating film of a monochromatic color filter coloring composition is formed on a transparent substrate), the retardation can be measured through no mask.

The retardation value in the thickness direction of a film such as a biaxial retardation film can also be measured in the same manner as above.

A liquid crystal device according to a second embodiment of the present invention is provided with an optical compensation layer formed inside of a polarizing plate disposed on each outside surface of a liquid crystal cell and uses the color filter according to the first embodiment of the present invention which is explained as above. Such a liquid crystal device ensures that a difference between the chromaticity when viewed from a direction perpendicular to the display surface and the chromaticity when viewed from an oblique direction can be limited in a specified range and therefore, the dispersion of the polarization state of the light passing through the display region of each color pixel of the color filter is reduced, so that the visibilities from oblique directions and from the front are improved.

When the liquid crystal display device is made to display black, the chromaticity (u, v) represented by a uv chromaticity diagram of the USC (u, v) color system (CIE1960) is measured. It is necessary that the color difference Δuv given by the following equation (1) be 0.02 or less in a range of θ (degrees): $0 < \theta \leq 60$.

$$\Delta uv = [\{u(\perp) - u(\theta)\}^2 + \{v(\perp) - v(\theta)\}^2]^{1/2} \quad (1)$$

wherein $(u(\perp), v(\perp))$ is a chromaticity as viewed from a vertical direction and $(u(\theta), v(\theta))$ is a chromaticity as viewed from a direction inclined at an angle of θ degrees with the direction of the normal line of the display surface.

When the chromaticity difference Δuv exceeds 0.02, there is a large difference between the chromaticity as viewed from the vertical direction and the chromaticity as viewed from a tilted direction when black is displayed, and specifically, the hue of the display image differs depending on viewing angle, so that the liquid crystal display device is resultantly deteriorated in display qualities. When this liquid crystal display device is used as a television or audio-visual device, the parallax between the center and edge of the display also causes a difference in color, thus this problem is significant in a liquid crystal television with a large screen having a diagonal size of 42 inches or more.

Next, the principle of the liquid crystal display device according to the second embodiment of the present invention will be explained.

Almost all of the optical compensation layers to be used in the aforementioned VA-mode liquid crystal display device and the like are usually a biaxial retardation film having an index ellipsoid having the following relation between indices: $n_x \geq n_y > n_z$ or a retardation film formed by applying a polymerizable liquid crystalline and/or non-polymerizable liquid crystalline material. In the case of using these films, the retardation value Rth in the thickness direction has a wavelength dispersion (hereinafter referred to as "follows the Cauchy dispersion formula") which is such that the retardation increases with increase in wavelength or with decrease in wavelength.

A VA-mode liquid crystal display device having wavelength dispersibility also in the birefringence of a liquid crystal when viewed from an oblique direction produces such a defect that the display characteristics when viewed from an oblique direction in displaying, particularly, black display characteristics are deteriorated unless the wavelength dispersion of Rth of each of these films completely compensates the wavelength dispersibility of the liquid crystal. Specifically, when viewed from an oblique direction, the display of black is yellowed, which exerts an adverse influence on visibilities.

Also, in, for example, the above IPS-mode or FFS-mode liquid crystal display device known as wide-viewing angle liquid crystal mode liquid crystal display devices because of the independence of the viewing angle dependency of the liquid crystal, almost all of the optical compensation layers are usually biaxial retardation films having the following relation between indices: $n_x \geq n_y \geq n_z$ or $n_x \geq n_y > n_z$ or transparent protective films such as TAC (triacetyl cellulose) having no optical compensation ability. When these films are used, the positive retardation Rth in the thickness direction eventually takes a value range from 0 to 100.

Generally, in IPS-mode liquid crystal display devices producing no retardation in the thickness direction, the positive retardation in the thickness direction of these films is a cause of leakage of light, causing such a disorder that the display characteristics when viewed from an oblique direction particularly in the black state is impaired. Namely, when viewed from an oblique direction, the display of black was yellowed, which exerted an adverse influence on visibilities.

On the other hand, it is desired that the absolute value of the birefringence of a color filter be 0.01 or less, that is, it is desired that the retardation value (Rth) in the thickness direction satisfy the following relation: Rth (R)=Rth (G)=Rth (B)=0, each Rth being preferably nearest to 0. However, the inventors of the present invention have found that the retardation value (Rth) in the thickness direction of each of the red, green and blue pixels differs depending on the type of pigment, the degree of fineness of the pigment, dispersibility of the pigment in a matrix resin and the type of matrix resin (for example, an acryl resin and card resin), and that each color pixel has the following nature: for example, red has a positive or negative Rth, blue has a positive Rth and green has a negative Rth.

As a result, though the visibility from the front (vertical direction) with the display surface is good, light leaks only in the case of a specified color in the visibility (hereinafter abbreviated as "oblique visibility") from an oblique direction, for example, at an angle of 45 degrees, so that coloring such as a reddish, bluish or greenish tint is seen when viewed from an oblique direction.

It is more important for the chromaticity of the color filter when viewed from the front in the black state to be closer to the chromaticity when a polarizing plate is arranged in a crossed nicol state with progress of a high-contrast color filter and specifically, with decrease in the depolarization of the color filter.

The dichroism of the polarizing plate is also improved, so that a high-contrast polarizing plate has come to be used recently. The hue of the polarizing plate in crossed nicols is almost bluish. Specifically, because the leakage of light having a wavelength of about 400 nm from the polarizing plate is increased, the hue as viewed from the front in the black state is bluish.

Therefore, it is necessary to select a combination for obtaining an optimum oblique visibility in combinations of optical elements, such as a liquid crystal layer, a polarizing plate, a retardation plate and an alignment film, of a liquid crystal display device, and it is also necessary to make bluish the chromaticity as viewed from an oblique direction to minimize the difference between the color when viewed from the front and the color when viewed from an oblique direction.

The inventors of the present invention have made earnest studies concerning these problems and as a result, found that when the retardation value Rth in the thickness direction of each color pixel of a color filter satisfies the following equations (2) and (3), a liquid crystal display device having good oblique visibility is obtained.

$$Rth(G) \geq 0 \qquad (2)$$

$$Rth(B) < Rth(G) > Rth(R) \qquad (3)$$

Specifically, when the retardation value in the thickness direction of the green pixel is designed to be 0 or more and the retardation values in the thickness directions of blue and red pixels are designed to be smaller than the retardation value in the thickness direction of the green pixel, the retardation value in the thickness direction of the color filter has no influence when viewed from the front and the leakage of light in the blue region is larger than that in the green region, so that the display is bluish when viewed from an oblique direction, thereby making it possible to reduce a difference in color from the front chromaticity.

It has been found that in the case of combining the wavelength dispersibility of structural members other than the color filter, for example, a TAC film in this manner, there are optimum values of the retardation in the thickness direction of the color filter besides the combination of the retardation values represented by the equation $$Rth(R)=Rth(G)=Rth(B)=0.$$

Next, the color filter for a liquid crystal display device according to the first embodiment of the present invention will be explained in more detail.

A color filter shown in FIG. 1 is provided with three color pixels: a red pixel 3R, a green pixel 3G and a blue pixel 3B. The color filter is not limited to these three colors and may be a combination of complementary colors or may be a multi-color filter having three or more colors containing complementary colors and other colors.

In order to obtain good front visibility and especially, a compressed color having a lower brightness of black, particularly, in the black state, the particle size d50 at which the integrated amount of particles corresponds to 50% of the whole amount on the integral curve of a number grain distribution in the particle size distribution of primary particles of a pigment is preferably 40 nm or less and more preferably 30 nm or less in the case of a color filter in which color display pixels are formed using a pigment dispersion type color composition. This is because a liquid crystal display device having high visibility not only from an oblique direction but also from the front can be obtained when the primary particle diameter d50 of a pigment is in the above range.

As the red pixel, red pigments, for example, C.I. Pigment Red 7, 14, 41, 48:2, 48:3, 48:4, 81:1, 81:2, 81:3, 81:4, 146, 168, 177, 178, 179, 184, 185, 187, 200, 202, 208, 210, 246, 254, 255, 264, 270, 272 and 279 may be used and may also be combined with yellow pigments and orange pigments.

Examples of the yellow pigment include C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 147, 151, 152, 153, 154, 155, 156, 161, 162, 164, 166, 167, 168, 169, 170, 171, 172, 173, 174, 175, 176, 177, 179, 180, 181, 182, 187, 188, 193, 194, 199, 198, 213 and 214.

Examples of the orange pigment include C.I. Pigment Orange 36, 43, 51, 55, 59, 61, 71 and 73.

When the red pixel contains one or more of diketopyrrolopyrrole type red pigments and anthraquinone type red pigments, this is preferable because a desired Rth is easily obtained.

The reason for this is that these red pigments have high transmittivity, and also these pigments can give a high contrast and an Rth value which is controlled to some extent between a positive value and a negative value and its absolute value which is also controlled to some extent by exercising ingenuity in a method of synthesizing pigments and a micronizing treatment thereof.

It may be said that the additivity principle is almost established between the Rth value and the mixing ratios of the pigments to be used. The amount of each pigment based on the total weight of the pigments is as follows: the amount of a diketopyrrolopyrrole type red pigment is 0 to 100% by weight and preferably 10 to 90% by weight and an anthraquinone type red pigment is 0 to 66% by weight and preferably 5 to 70% by weight from the viewpoint of the hue, brightness, film thickness and contrast of the pixel. When attention is focused, particularly, on the contrast, the amount of a diketopyrrolopyrrole type red pigment is more preferably 25 to 75% by weight and an anthraquinone type red pigment is more preferably 30 to 60% by weight.

Also, yellow pigments and orange pigments may be contained in the red pixel for the purpose of adjusting the hue and it is preferable to use an azo metal complex type yellow pigment from the viewpoint of obtaining a high contrast.

The amount of the azo metal complex type yellow pigment is preferably 5 to 25% by weight based on the total amount of the pigments. When the amount of the yellow pigment is less than 5% by weight, the adjustment of the hue such as sufficiently improved brightness is difficult whereas when the amount of the yellow pigment exceeds 30% by weight, the hue is shifted too much to the yellowish side and therefore, color reproducibility is possibly impaired.

In the above case, C.I. Pigment Red 254 is preferable as the diketopyrrolopyrrole type red pigment, C.I. Pigment Red 177 is preferable as the anthraquinone type red pigment and C.I. Pigment Yellow 150 is preferable as the azo metal complex type yellow pigment from the viewpoint of, for example, excellent light fastness, heat resistance, transparency and tinting strength.

For the green pixel, green pigments such as C.I. Pigment Green 7, 10, 36, 37 and 58 may be used and these green pigments may also be used in combination with a yellow pigment. As the yellow pigment, pigments similar to those described in the red pixel can be used.

The green pixel preferably contains at least one type of a halogenated metal phthalocyanine type green pigment, azo type yellow pigment and quinophthalone type yellow pigment among these pigments from the viewpoint of making it easy to obtain a desired Rth. This is because the halogenated metal phthalocyanine green pigment makes it easy to control the Rth (G) to some extent by selecting the center metal atom. In the case where the center metal atom is, for example, copper, the Rth takes a negative value. In the case where the center metal atom is zinc, the Rth value is increased to a large positive value from 0, which is larger than the Rth value obtained when copper is the center metal atom. For this, brominated zinc phthalocyanine is preferable as the green pigment, specifically, a brominated zinc phthalocyanine having an average of 13 bromines in one molecule is desirable. Another reason is that the azo type yellow pigment ensures 0 or a positive Rth (G) irrespective of micronizing treatment and the quinophthalone type yellow pigment ensures a negative Rth (G) irrespective of micronizing treatment, so that a combination of these pigments make it easy to obtain a desired Rth.

With regard to the green pixel, it may be said that the additivity principle is almost established between the Rth value and the mixing ratios of the pigments to be used. The amount of each pigment based on the total weight of pigments is as follows: the amount of a halogenated metal phthalocyanine type green pigment is 30 to 90% by weight and an azo type yellow pigment and/or a quinophthalone type yellow pigment is 0 to 60% by weight and preferably 5 to 60% by weight from the viewpoint of the hue, brightness and film thickness of the pixel. Moreover, it is more preferable that the amount of the halogenated metal phthalocyanine type green pigment be 50 to 85% by weight, the amount of the azo type yellow pigment be 5 to 45% by weight and the amount of the quinophthalone type yellow pigment be 5 to 45% by weight.

In the above case, C.I. Pigment Green 7, 36 and 58 are preferable as the halogenated metal phthalocyanine type green pigment, C.I. Pigment Yellow 150 is preferable as the azo type yellow pigment and C.I. Pigment Yellow 138 is preferable as the quinophthalone type yellow pigment from the viewpoint of, for example, excellent light fastness, heat resistance, transparency and tinting strength.

As the blue pixel, blue pigments, for example, C.I. Pigment Blue 15, 15:1, 15:2, 15:3, 15:4, 15:6, 16, 22, 60 and 64 may be used and violet pigments may be used together. Examples of the violet pigment include C.I. Pigment Violet 1, 19, 23, 27, 29, 30, 32, 37, 40, 42 and 50.

The blue pixel preferably contains at least one type of metal phthalocyanine type blue pigments and dioxazine type violet pigments among these pigments from the viewpoint of making it easy to obtain a desired Rth ranging from a negative value to around zero. With regard to the amounts of these pigments, the amount of the metal phthalocyanine type blue pigment is preferably 40 to 100% by weight, and the amount of the dioxazine type violet pigment is preferably 0 to 50% by weight and more preferably 1 to 50% by weight from the viewpoint of the hue, brightness and film thickness of the pixel. Further, the amount of the metal phthalocyanine type blue pigment is more preferably 50 to 98% by weight and the amount of the dioxazine type violet pigment is more preferably 2 to 25% by weight.

In the above case, C.I. Pigment Blue 15:6 is preferable as the metal phthalocyanine type blue pigment and C.I. Pigment Violet 23 is preferable as the dioxazine type violet pigment from the viewpoint of excellent light fastness, heat resistance, transparency and tinting strength.

Also, examples of the inorganic pigment include metal oxide powders, metal sulfide powders and metal powders such as yellow lead, zinc yellow, iron oxide red (red iron (III) oxide), cadmium red, ultramarine blue, iron blue, chromium oxide green and cobalt green.

The inorganic pigment is used in combination with an organic pigment to ensure good coatability, sensitivity and developing ability while balancing the chroma and brightness. Further, dyes may be contained for toning to the extent that the heat resistance is not impaired.

The pigment contained in the color pixel is preferably micronized to develop a color filter having high luminance and high contrast and preferably has a smaller average particle diameter. The average primary particle diameter of the pigment can be calculated by the image analysis of a photograph of the pigment taken by a transmission type electron microscope.

The average primary particle diameter of the pigment is preferably 40 nm or less, more preferably 30 nm or less and more preferably 20 nm or less. Also, the average primary particle diameter is preferably 5 nm or more. When the average primary particle diameter of the pigment exceeds the above upper limit, the liquid crystal display device is deteriorated in visibility in the black state. Also, when the average primary particle diameter of the pigment is less than the above lower limit, it is difficult to disperse the pigment and it is therefore difficult to keep the color composition stable and to secure the fluidity of the pigment.

As a result, the luminance and chromatic characteristics of the color filter are impaired. Particularly, organic pigments having an average primary particle diameter exceeding 40 μm have an adverse influence on the front visibility.

Also, each color pixel formed on the transparent substrate is sandwiched between two polarizing plates and backlight is applied from one polarizing plate side to measure the light transmitted through the other polarizing plate by a luminosity meter, thereby calculating a contrast C from the ratio of the luminance (Lp) of the light when the polarizing plates are arranged in parallel to the luminance (Lc) of the light when the polarizing plates lie at right angles to each other. In the case where C is calculated: $C=Lp/Lc$, and further, CS represents the contrast of only the substrate with no color pixel, CR represents the contrast of the red pixel, CG represents the contrast of the green pixel and CB represents the contrast of the blue pixel, the front visibility of the liquid crystal display device in the black state is improved as shown in Table 6 described below when the following requirements are satisfied: CR/CS>0.45, CG/CS>0.45 and CB/CS>0.45. In other words, the display of vivid black due to reduced leakage of light can be reproduced.

When the requirements CR/CS>0.45, CG/CS>0.45 and CB/CS>0.45 are not satisfied, and specifically, when CR/CS≦0.45, CG/CS≦0.45 or CB/CS≦0.45, the leakage of light is increased in the black state and therefore, a liquid crystal display device having excellent front visibility is not obtained.

Moreover, a smaller difference in retardation between colors enables the production of a liquid crystal display device superior both in oblique visibility and in front visibility.

In this case, even if the requirements CR/CS>0.45, CG/CS>0.45 and CB/CS>0.45 are satisfied, there is the case where only insufficient front visibility is obtained when the difference in retardation between colors is large.

Examples of the measures taken to control the average primary particle diameter of the pigment and retardation in the thickness direction of the pigment include a method (called an abrasion method) in which a pigment is mechanically crushed to control the primary particle diameter and particle shape, a method (called a precipitation method) in which a pigment dissolved in a good solvent is poured into a poor solvent to precipitate a pigment having a desired primary particle diameter and particle shape and a method (called a synthetic precipitation method) in which a pigment having a desired primary particle diameter and particle shape is produced when it is synthesized. An adequate method for individual pigments may be selected according to a synthetic method and chemical properties of a pigment to be used.

Each of these methods will be explained below. Any of these methods may be used for control of the primary particle diameter and particle shape of the pigment contained in the color pixel layer constituting the color filter according to the first embodiment of the present invention.

The abrasion method is a method in which a pigment is mechanically kneaded in the presence of an abrasive agent such as water-soluble inorganic salts, for example, common salt and a water-soluble organic solvent which does not dissolve the abrasive agent (hereinafter, this treatment is called salt milling) by using, for example, a ball mill, sand mill or kneader and then, the inorganic salt and organic solvent are removed by washing with water, followed by drying to obtain a pigment having a desired primary particle diameter and particle shape.

Here, there is the case where the pigment grows into crystals by the salt milling treatment and therefore, it is effective to use a method preventing the crystal growth by adding a solid resin at least a part of which is dissolved in the above organic solvent and a pigment dispersant.

As to the ratio of the pigment to the inorganic salt, though the pigment-micronizing efficiency is promoted when the ratio of the inorganic salt is increased, the productivity is dropped because the throughput of the pigment is reduced. Generally, the inorganic salt is used in an amount of 1 to 30 parts by weight and preferably 2 to 20 parts by weight based on 1 part of the pigment. Also, the above water-soluble organic solvent is added to allow the pigment and inorganic salt to form a uniform solid and usually used in an amount of 0.5 to 30 parts by weight based on 1 part by weight of the pigment, depending on the mixing ratio of the pigment to the inorganic salt.

To explain the abrasion method in more detail, a small amount of a water-soluble organic solvent is added as a wetting agent in a mixture of the pigment and the water-soluble inorganic salt, the mixture is strongly kneaded by a kneader and the mixture is then poured into water, followed by stirring the mixture by a high-speed mixer and the like to prepare a slurry. Then, this slurry is filtered, followed by washing with water and drying to thereby obtain a pigment having a desired primary particle diameter and particle shape.

The precipitation method is a method in which after the pigment is dissolved in an adequate good solvent, the solution is mixed in a poor solvent to precipitate a pigment having a desired primary particle diameter and particle shape. The size of the primary particle diameter and particle shape of the pigment can be controlled by the type and amount of the solvent, precipitation temperature and precipitation speed.

Generally, because pigments are insoluble in solvents, usable solvents are limited. However, as the usable solvents, strong acidic solvents such as concentrated sulfuric acid, polyphosphoric acid and chlorosulfonic acid or basic solvents such as liquid ammonia and a dimethylformamide solution of sodium methylate are known.

As a typical example of the precipitation method, there is the acid pasting method, in which a solution obtained by dissolving a pigment in an acid solvent is poured into another solvent to reprecipitate, thereby obtaining fine particles. It is common in industry to use a method of injecting water into a sulfuric acid solution from the viewpoint of cost. Though no particular limitation is imposed on the concentration of sulfuric acid to be used, it is preferable that the concentration of sulfuric acid be 95 to 100% by weight. Though no particular limitation is imposed on the amount of sulfuric acid in the pigment, it is preferable to use sulfuric acid in an amount 3 to 10 times that of the pigment based on the fact that if the amount is too small, the viscosity of the solution is high, leading to impaired handling characteristics, whereas if the amount is too large, the pigment treating efficiency may be deteriorated.

In this case, it is unnecessary for the pigment to be perfectly dissolved. The temperature when the pigment is dissolved is preferably 0 to 50° C. When the temperature is less than the above range, there is a fear that sulfuric acid is frozen and also, the solubility is lowered. When the temperature is too high, side reactions are easily caused.

The temperature of water to be injected is preferably 1 to 60° C. When the injection of water is started at a temperature exceeding the above range, water is boiled by the heat of dissolution of sulfuric acid, which may involve dangerous operations. When the temperature of water is less than the above range, water is frozen. The time required for the injection is preferably 0.1 to 30 minutes based on 1 part of the pigment. The primary particle diameter tends to be larger as the time is longer.

The primary particle diameter and particle shape of the pigment can be controlled in consideration of the degree of grading of the pigment by selecting a method comprising a combination of the precipitation method such as the acid pasting method and the abrasive method such as the salt milling method, and the combination of these methods is more preferable from the point that the fluidity required for the dispersion can be secured.

At the time of the salt milling or acid pasting, a dyestuff derivative, resin type pigment dispersant and a dispersion agent such as a surfactant as shown below may be used to prevent the aggregation of the pigment when the primary particle diameter and particle shape of the pigment are controlled.

Also, the primary particle diameter and particle shape are controlled in the presence of two or more types of pigments, thereby making it possible to finish the production of a pigment as a stable dispersion even if the pigment is one which is itself dispersed with difficulty.

As specific examples of the precipitation method, there is the leuco method. When vat dye type pigments such as a flavanthrone type, perinone type, perylene type and indanthrone type are reduced by an alkaline hydrosulfite, the quinone group forms a sodium salt of hydroquinone (leuco compound) which is soluble in water. Pigments which are insoluble in water and have a small primary particle diameter can be precipitated by adding a proper oxidizer to this aqueous solution to oxidize these pigments.

The synthetic precipitation method is a method used to synthesize a pigment and to precipitate a pigment having a desired primary particle diameter and particle shape. However, unless pigment particles are coagulated to form large secondary particles in the case of taking produced fine pigments out of the solvent, it is difficult to adopt filtration, which is the common separation method. Therefore, this method is usually applied to pigments such as azo types which are synthesized in an aqueous system in which secondary coagulation is easily caused.

Furthermore, in order to control the primary particle diameter and particle shape of the pigment, it is possible to disperse the pigment by a high-speed sand mill or the like for a long period of time (so-called dry milling method in which a pigment is dry-milled) to thereby make it possible to decrease the primary particle diameter of the pigment and to disperse the pigment at the same time.

Also, in the color filter according to the present embodiment, a retardation regulator may be added to a color filter color composition having one or more colors for the purpose of improving, particularly, oblique visibility. The retardation regulator is an additive capable of regulating the retardation in the thickness direction of a color filter obtained by coating a transparent substrate, reflective substrate or semiconductor substrate with a color composition.

The compound which can be used as the retardation regulator is preferably an organic compound having good dispersibility to secure a contrast as high as 1000 or 3000 or more. Specifically, although particulate materials such as inorganic materials may be adopted, use of these materials is preferably avoided from the viewpoint of light scattering characteristics and depolarization characteristics. Also, though the retardation regulators may be added in all color pixels when a color filter having a plurality of colors is formed on a transparent substrate, the retardation regulators may be added solely to one or two color pixels.

As specific retardation regulators, one or more types selected from organic compounds containing a plane structural group having one or more crosslinking groups may be used, these organic compounds including melamine resins, porphyrin compounds, polymerizable liquid crystal compounds and acryl resins containing 70 to 90 mol % of one or more aromatic group-containing monomers.

It is considered that usually, the Rth of the whole film can be cancel out only by adding particles which have a plane structural group with a reverse positive or negative birefringence to that of the pigment and other resins. However, simple addition of particles having a plane structural group produces only a small effect on the Rth of the whole film because the particles themselves are aligned at random.

In light of this, the inventors of the present invention have made earnest studies, and as a result, found that when the plane structural group of the retardation regulator is allowed to have one or more crosslinking groups, the Rth of the whole film is largely changed so that a satisfactory effect is obtained. Also, the inventors of the present invention have found that when, among above regulators having a plane structural group, an acryl resin having the characteristics that the plane structural group is an aromatic group and 70 to 90 mol % of a monomer having the aromatic group in a resin solid is used as the retardation regulator, a sufficient effect as the retardation regulator is obtained.

Specifically, when, for example, the retardation regulator has a functional group which crosslinks in a photo-setting process or thermo-setting process in the photolithographic process, the plane structural group does not freely rotate and also the plane structural group is more aligned in the same direction when shrinking at heat curing, so that it is easily fixed, thereby increasing the value of the retardation Rth in the thickness direction (in a positive direction). In short, the function as the retardation regulator can be developed.

As the plane structural group, those which have at least one aromatic ring and are known compounds typified by monocyclic hydrocarbons having, for example, a phenyl group, cumenyl group, mesityl group, tolyl group, xylyl group, benzyl group, phenethyl group, styryl group, cinnamyl group or trityl group, and polycyclic hydrocarbons having, for example, pentalenyl group, indenyl group, naphthyl group, biphenylene group, acenaphthylene group, fluorene group, phenanthryl group, anthracene group, triphenylene group, pyrene group, naphthacene group, pentaphene group, pentacene group, tetraphenylene group or trinaphthylene group may be used. Examples of heteromonocyclic compounds may include known compounds having, for example, a pyrrolyl group, imidazolyl group, pyrazolyl group, pyridyl group, pyrazinyl group or triazine group. Examples of heteropolycyclic compounds may include known compounds having, for example, an indolizinyl group, isoindolyl group, indolyl group, purinyl group, quinolyl group, isoquinolyl group, phthalazinyl group, naphthylidinyl group, quinoxalinyl group, cinolinyl group, carbazolyl group, carbolinyl group, acridinyl group or porphyrin group. These groups may be those having a substituent such as a hydrocarbon group or halogen group.

As at least one crosslinking group attached to the plane structural group, unsaturated polymerizable groups (A, B, C, D, E and F) represented by the following formula, functional groups (I, J, K, L, M, N and O) or thermally polymerizable groups (G, H, P, Q, R, S, T and U) are preferable, epoxy groups (G and H) are more preferable and P to U are even more preferably used.

Also, as the unsaturated polymerizable group, ethylenic unsaturated groups (A, B, C and D) are more preferable and also, —$CH_2NHCOCH=CH_2$, —$CH_2NHCO(CH_2)_7CH=CH(CH_2)_7CH_3$, —$OCO(C_6H_4)O(CH_2)_6CH=CH_2$ and the like are preferably used.

These crosslinking groups are easily obtained by reacting a compound having a functional group such as glycidyl(meth)acrylate, 2-(meth)acryloyloxyisocyanate or tolylene-2,4-diisocyanate which reacts with the above reactive functional group and an ethylenic unsaturated group by a known method when the plane structural group has at least one reactive functional group such as a hydroxyl group.

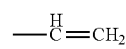

(A)

-continued

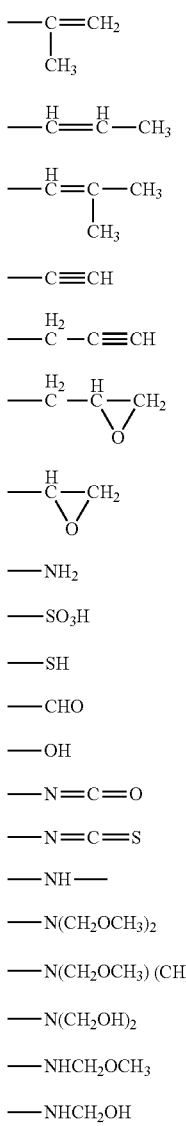

(B)
(C)
(D)
(E)
(F)
(G)
(H)
(I)
(J)
(K)
(L)
(M)
(N)
(O)
(P)
(Q)
(R)
(S)
(T)
(U)

As the melamine compound, commercially available ones represented by the following formula (1) may be preferably used. However, any of the compounds having the above plane structural group may be used and known ones may be used. These melamine compounds are exemplified below.

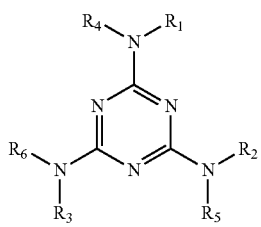

(1)

In the above formula, $R_1$, $R_2$ and $R_3$ respectively represent a hydrogen atom, a methylol group, an alkoxymethyl group or an alkoxy n-butyl group, and $R_4$, $R_5$ and $R_6$ respectively represent a methylol group, an alkoxymethyl group or an alkoxy n-butyl group. A copolymer obtained by combining two or more types of repeat units may be used. Two or more types of homopolymers or copolymers may be used together.

Also, besides the above compounds, compounds having a 1,3,5-triazine ring and described in, for example, JP-A 2001-166144 may be used. Also, compounds represented by the following formula (2) are also preferably used.

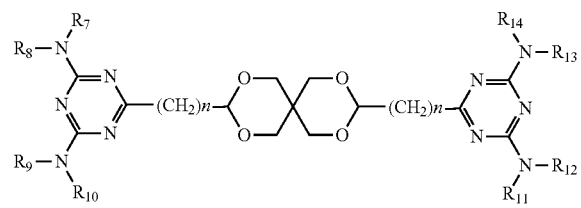

(2)

$R_7$ to $R_{14}$ respectively represent a hydrogen atom, an alkyl group, an alkenyl group, an aryl group or a heterocyclic group and are respectively preferably a hydrogen atom.

Alternatively, compounds having a porphyrin skeleton represented by the following formula (3) are preferably used. n is an integer from 1 to 20 and compounds represented by the above formula in which n is 2 are preferably used.

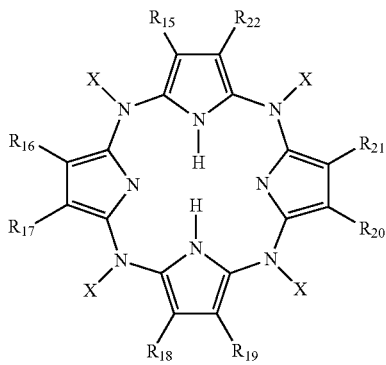

(3)

In the above formula, $R_{15}$ to $R_{22}$ respectively represent a hydrogen atom, a halogen atom, an alkoxy group, an alkylthio group, a substituted or unsubstituted phenoxy group, a substituted or unsubstituted naphthoxy group, a substituted or unsubstituted phenylthio group or a substituted or unsubstituted naphthylthio group.

Examples of the halogen atom represented by $R_{15}$ to $R_{22}$ include fluorine, chlorine, bromine and iodine. Examples of the alkoxy group and thioalkyl group include, though are not particularly limited to, preferably straight-chain, or branched or cyclic alkyl groups in which the alkyl group in the substituent has 1 to 12 carbon atoms and preferably 1 to 8 carbon atoms. —Z represents —CH— or —N—.

Specific examples of the alkyl group in the alkoxy group and thioalkyl group include a methyl group, ethyl group, n-propyl group, iso-propyl group, n-butyl group, iso-butyl group, sec-butyl group, t-butyl group, n-pentyl group, iso-pentyl group, 2-methylbutyl group, 1-methylbutyl group, neo-pentyl group, 1,2-dimethylpropyl group, 1,1-dimethylpropyl group, cyclopentyl group, n-hexyl group, 4-methylpentyl group, 3-methylpentyl group, 2-methylpentyl group, 1-methylpentyl group, 3,3-dimethylbutyl group, 2,3-dimethylbutyl group, 1,3-dimethylbutyl group, 2,2-dimethylbutyl group, 1,2-dimethylbutyl group, 1,1-dimethylbutyl group, 3-ethylbutyl group, 2-ethylbutyl group, 1-ethylbutyl group, 1,2,2-trimethylbutyl group, 1,1,2-trimethylbutyl group, 1-ethyl-2-methylpropyl group, cyclohexyl group, n-heptyl group, 2-methylhexyl group, 3-methylhexyl group, 4-methylhexyl group, 5-methylhexyl group, 2,4-dimethylpentyl group, n-octyl group, 2-ethylhexyl group, 2,5-dimethylhexyl group, 2,5,5-trimethylpentyl group, 2,4-dimethylhexyl group, 2,2,4-trimethylpentyl group, n-octyl group, 3,5,5-trimethylhexyl group, n-nonyl group, n-decyl group, 4-ethyloctyl group, 4-ethyl-4,5-dimethylhexyl group, n-undecyl group, n-dodecyl group, 1,3,5,7-tetraethyloctyl group, 4-butyloctyl group, 6,6-diethyloctyl group, n-tridecyl group, 6-methyl-4-butyloctyl group, n-tetradecyl group, n-pentadecyl group, 3,5-dimethylheptyl group, 2,6-dimethylheptyl group, 2,4-dimethylheptyl group, 2,2,5,5-tetramethylhexyl group, 1-cyclopentyl-2,2-dimethylpropyl group and 1-cyclohexyl-2,2-dimethylpropyl group.

Specific examples of the substituted or unsubstituted phenoxy group include a phenoxy group, 2-methylphenoxy group, 3-methylphenoxy group, 4-methylphenoxy group, 2-ethylphenoxy group, 3-ethylphenoxy group, 4-ethylphenoxy group, 2,4-dimethylphenoxy group, 3,4-dimethylphenoxy group, 4-t-butylphenoxy group, 4-aminophenoxy group, 4-dimethylaminophenoxy group and 4-diethylaminophenoxy group.

Specific examples of the substituted or unsubstituted naphthoxy group include a 1-naphthoxy group, 2-naphthoxy group, nitronaphthoxy group, cyanonaphthoxy group, hydroxynaphthoxy group, methylnaphthoxy group and trifluoromethylnaphthoxy group.

Specific examples of the substituted or unsubstituted phenylthio group include a phenylthio group, 2-methylphenylthio group, 3-methylphenylthio group, 4-methylphenylthio group, 2-ethylphenylthio group, 3-ethylphenylthio group, 4-ethylphenylthio group, 2,4-dimethylphenylthio group, 3,4-dimethylphenylthio group, 4-t-butylphenylthio group, 4-aminophenylthio group, 4-dimethylaminophenylthio group and 4-diethylamonophenylthio group.

Specific examples of the substituted or unsubstituted naphthylthio group include 1-naphthylthio group, 2-naphthylthio group, nitronaphthylthio group, cyanonaphthylthio group, hydroxynaphthylthio group, methylnaphthylthio group and trifluoromethylnaphthylthio group.

X may be used together with two or more types of compounds (for example, a compound having a 1,3,5-triazine ring and a compound having a porphyrin skeleton).

Examples of the epoxy compounds containing a plane structural group may include bisphenol type epoxy compounds, for example, bisphenol A-type epoxy compounds, bisphenol F-type epoxy compounds and bisphenol AD-type epoxy compounds; novolac type epoxy compounds, for example, phenol novolac type epoxy compounds, and cresol novolac type epoxy compounds; glycidylamine type epoxy compounds, for example, tetraglycidyldiaminodiphenylmethane, triglycidyl-p-aminophenol, triglycidyl-m-aminophenol and tetraglycidyl-m-xylenediamine; glycidyl ester type epoxy compounds, for example, diglycidylphthalate, diglycidylhexahydrophthalate and diglycidyl tetrahydrophthalate; and heterocyclic epoxy compounds, for example, triglycidylisocyanurate and glycidylglycidoxyalhydantoin. One example is shown in the following formula (4).

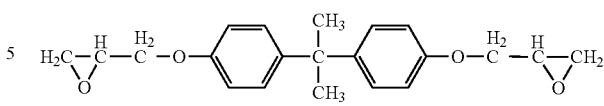

(4)

As the polymerizable liquid crystal compound, rod-like liquid crystal molecules or discotic liquid crystal molecules may be applied, the discotic liquid crystal molecule being preferable. As the rod-like liquid crystal molecules, liquid crystal molecules described in JP-A 2006-16599 may be adopted. Besides the above compounds, for example, azomethines, azoxys, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles may be used. As the discotic liquid crystal molecule, for example, those described in JP-A 8-27284 may be used. Examples of these molecules are described below.

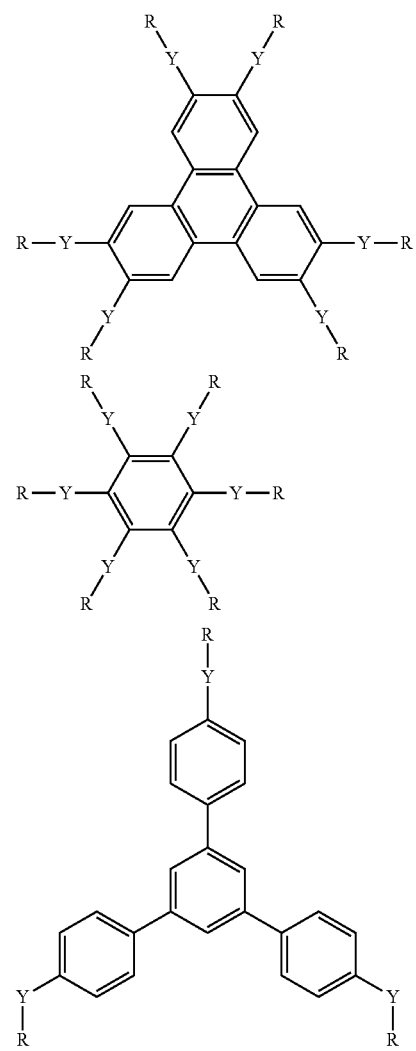

-continued

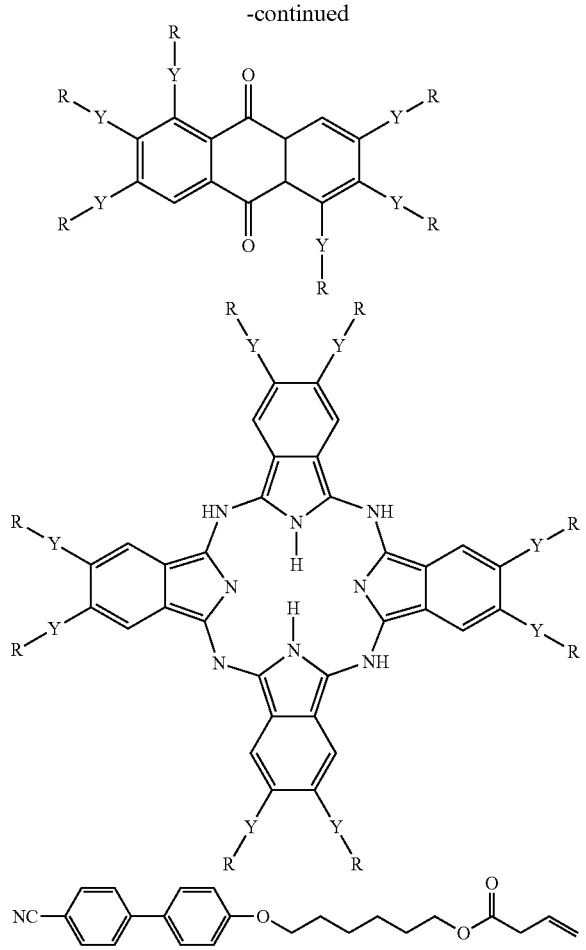

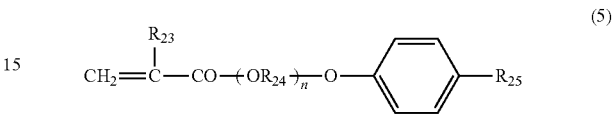

In the above formulae, Y represents a divalent connecting group selected from the group consisting of an alkylene group, alkenylene group, arylene group, —CO—, —NH—, —O—, —S— or a combination of these groups, or a group obtained by combining at least two of these divalent groups.

The number of carbons of the alkylene group is preferably 1 to 12, the number of carbons of the alkenylene group is preferably 2 to 12 and the number of carbons of the arylene group is preferably 6 to 10. The alkylene group, alkenylene group and arylene group may respectively have a substituent (for example, an alkyl group, halogen atom, cyano, alkoxy group and acyloxy group).

R is at least one crosslinking group selected from unsaturated polymerizable groups (A, B, C, D, E and F), functional groups (I, J, K, L, M, N and O) and thermally polymerizable groups (G, H, P, Q, R, S, T and U) or an alkyl group, alkenyl group, aryl group or heterocyclic group substituted with the crosslinking group.

As the unsaturated polymerizable group, ethylenic unsaturated polymerizable groups (A, B, C and D) are more preferable and also, —CH$_2$NHCOCH═CH$_2$, —CH$_2$NHCO(CH$_2$)$_7$CH═CH(CH$_2$)$_7$CH$_3$, —OCO(C$_6$H$_4$)O(CH$_2$)$_6$CH═CH$_2$ or the like is preferably used.

Examples of the acryl resin containing 70 to 90 mol % of an aromatic-containing monomer include acryl resins obtained by polymerizing various acrylates or methacrylates such as melamine(meth)acrylate and benzyl(meth)acrylate, styrene, or aromatic-containing monomers represented by the following formula (5) with (meth)acrylates such as (met)acrylic acid, methyl(meth)acrylate, ethyl(meth)acrylate, (iso)propyl(meth)acrylate, (iso)butyl(meth)acrylate, (iso)pentyl(meth)acrylate, 2-hydroxyethyl(meth)acrylate, 2-hydroxypropyl(meth)acrylate, cyclohexyl(meth)acrylate, glycidyl(meth)acrylate, isobornyl(meth)acrylate, acid phosphooxyethyl(meth)acrylate, acid phosphooxypropyl(meth)acrylate, 3-chloro-2-acid phosphooxyethyl(meth)acrylate and acid phosphooxypolyethylene glycol mono(meth)acrylate. These compounds may be used either singly or in combinations of two or more.

$$CH_2=\underset{R_{23}}{\underset{|}{C}}-CO-(OR_{24})_n-O-\underset{}{\underset{}{\bigcirc}}-R_{25} \qquad (5)$$

In the formula, $R_{23}$ represents H or $CH_3$, $R_{24}$ represents an alkylene group having 2 or 3 carbon atoms, $R_{25}$ represents hydrogen or an alkyl group having 1 to 20 carbon atoms which may contain a benzene ring and n denotes an integer from 1 to 15.

In the above formula (5), the number of carbons of the alkyl group of $R_{25}$ is 1 to 20 and preferably 1 to 10. When the number of carbons of the alkyl group of $R_{25}$ is 1 to 10, the alkyl group becomes a hindrance which reduces the affinity between resins, so that the effect of promoting adsorption/alignment to the pigment is obtained, which improves the stability of the photosensitive color composition. However, when the number of carbons exceeds 10 on the other hand, the steric hindrance effect of the alkyl group is higher, showing a tendency to inhibit the adsorption/alignment of a benzene ring to the pigment, bringing about lower stability of the photosensitive color composition. This tendency is more significant with increase in the length of the carbon chain of the alkyl group of $R_{25}$ and when the number of carbons of $R_{25}$ exceeds 20, the adsorption/alignment of a benzene ring to the pigment is significantly lower. Examples of the alkyl group containing a benzene ring represented by $R_{25}$ may include a benzyl group and 2-phenyl(iso)propyl group.

Examples of the compound represented by the above formula (5) include ethylene oxide (EO)-modified (meth)acrylate of phenol, EO or propylene oxide (PO)-modified (meth) acrylate of paracumylphenol, EO-modified (meth)acrylate of nonylphenol and PO-modified (meth)acrylate of nonylphenol. Among these compounds, EO- or PO-modified (meth) acrylate of paracumylphenol produces a higher effect because it has not only the effect of π electrons of the above benzene ring but also its additional steric effect, thereby making it possible to form a good adsorption/alignment plane, thereby developing the retardation value Rth in the thickness direction.

Also, the above acryl resin contains 70 mol % to 90 mol % of an aromatic-containing monomer, and if this acryl resin is formulated to prepare a photosensitive resin composition, negative birefringence can be developed. The defects developed in an alkali developing type photosensitive color filter, that is, an unnecessary positive retardation value Rth of the order of 2 to +30 nm in the thickness direction which is caused by the influence of the pigment, dispersant and other binder resin is obviated and can further be reduced to a negative value. This ensures that a liquid crystal display device which has an originally desired retardation value of the order of 3 to −30 nm in the thickness direction and good display characteristics when viewed from an oblique direction can be provided.

Color compositions to be used for forming each color pixel of the color filter according to this embodiment will be explained.

A pigment carrier contained in the color composition to be used for forming each color pixel serves to disperse a pigment and is constituted of a transparent resin, its precursor or a mixture of these materials.

As the transparent resin, a resin having a transmittance of, preferably, 80% or more and more preferably 95% or more in an entire wavelength range of 400 to 700, which is the visible wavelength range, may be used together with the above acryl resin. The transparent resin includes a thermoplastic resin, thermo-setting resin and photosensitive resin, and its precursor includes a monomer or oligomer which is cured by radiation to produce a transparent resin. These compounds may be used either singly or in combinations of two or more.

The pigment carrier may be used in an amount of 30 to 700 parts by weight and preferably 60 to 450 parts by weight based on 100 parts by weight of the pigment in the color composition.

When a mixture of the transparent resin and its precursor is used as the pigment carrier, the transparent resin may be used in an amount of 20 to 400 parts by weight and preferably 50 to 250 parts by weight based on 100 parts by weight of the pigment in the color composition.

Also, the precursor of the transparent resin may be used in an amount of 10 to 300 parts by weight and preferably 10 to 200 parts by weight based on 100 parts by weight of the pigment in the color composition.

Examples of the thermoplastic resin include a butyral resin, styrene-maleic acid copolymer, chlorinated polyethylene, chlorinated polypropylene, polyvinyl chloride, vinyl chloride/vinyl acetate copolymer, polyvinyl acetate, polyurethane type resin, polyester resin, acryl type resin, alkyd resin, polystyrene resin, polyamide resin, rubber type resin, cyclized rubber type resin, celluloses, polybutadiene, polyethylene, polypropylene and polyimide resin.

Examples of the thermo-setting resin include an epoxy resin, benzoguanamine resin, rosin-modified maleic acid resin, rosin-modified fumaric acid resin, melamine resin, urea resin and phenol resin.

As the photosensitive resin, resins are used which are obtained by reacting a (meth)acryl compound or cinnamic acid having a reactive substituent such as an isocyanate group, aldehyde group or epoxy group with a linear polymer having a reactive substituent such as a hydroxyl group, carboxyl group or amino group to introduce a photo-crosslinking group such as a (meth)acryloyl group or styryl group into the linear polymer.

Also, a linear polymer containing an acid anhydride such as a styrene/maleic acid anhydride copolymer and α-olefin/maleic acid anhydride copolymer is half-esterified by a (meth)acryl compound having a hydroxyl group such as hydroxyalkyl(meth)acrylate is used.

Examples of the monomer or oligomer which is a precursor of the transparent resin include acrylates and methacrylates such as 2-hydroxyethyl(meth)acrylate, 2-hydroxypropyl(meth)acrylate, cyclohexyl(meth)acrylate, polyethylene glycol di(meth)acrylate, pentaerythritol tri(meth)acrylate, trimethylolpropanetri(meth)acrylate, dipentaerythritolhexa(meth)acrylate, tricyclodecanyl(meth)acrylate, melamine(meth)acrylate and epoxy(meth)acrylate, (meth)acrylic acid, styrene, vinyl acetate, (meth)acrylamide, N-hydroxymethyl(meth)acrylamide and acrylonitrile. These compounds may be used either singly or in combinations of two or more.

A photoinitiator or the like is added to the color composition in the case of curing the composition by irradiation with ultraviolet light.

As the photoinitiator, acetophenone type photoinitiators such as 4-phenoxydichloroacetophenone, 4-t-butyl-dichloroacetophenone, diethoxyacetophenone, 1-(4-isopropylphenyl)-2-hydroxy-2-methylpropan-1-one, 1-hydroxycyclohexyl phenyl ketone, 2-methyl-1[4-(methylthio)phenyl]-2-morpholinopropan-1-one and 2-benzyl-2-dimethylamino-1-(4-morpholinophenyl)-butan-1-one, benzoin type photoinitiators such as benzoin, benzoin methyl ether, benzoin ethyl ether, benzoin isopropyl ether and benzyl dimethyl ketal, benzophenone type photoinitiators such as benzophenone, benzoylbenzoic acid, methyl benzoylbenzoate, 4-phenylbenzophenone, hydroxybenzophenone, acrylated benzophenone and 4-benzoyl-4'-methyldiphenyl sulfide, thioxanthone type photoinitiators such as thioxanthone, 2-chlorothioxanthone, 2-methylthioxanthone, isopropylthioxanthone and 2,4-diisopropylthioxanthone, triazine type photoinitiators such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-trazine, and 2,4-trichloromethyl(4'-methoxystyryl)-6-triazine, borate type photoinitiators, carbazole type photoinitiators and imidazole type photoinitiators may be used.

The photoinitiator may be used in an amount of 5 to 200 parts by weight and preferably 10 to 150 parts by weight based on 100 parts by weight of the pigment in the color composition.

The above photoinitiators may be used either singly or in combinations of two or more. Compounds such as α-acyloxy ester, acylphosphine oxide, methylphenyl glyoxylate, benzyl, 9,10-phenanthrenequinone, camphorquinone, ethylanthraquinone, 4,4'-diethylisophthalophenone, 3,3',4,4'-tetra(t-butylperoxycarbonyl)benzophenone and 4,4'-diethylaminobenzophenone may be used as a sensitizer in combination with the photoinitiator.

The sensitizer may be contained in an amount of 0.1 to 60 parts by weight based on 100 parts by weight of the photoinitiator.

Moreover, the color composition may contain a polyfunctional thiol that works as a chain transfer agent. The polyfunctional thiol may be a compound having two or more thiol groups. Examples of the polyfunctional thiol include hexane dithiol, decane dithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutylate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine. These polyfunctional thiols may be used either singly or in combinations of two or more.

The polyfunctional thiol may be used in an amount of 0.2 to 150 parts by weight and preferably 0.2 to 100 parts by weight based on 100 parts by weight of the pigment in the color composition.

Moreover, a solvent may be contained to make it easy to form a filter segment by dispersing the pigment sufficiently in the pigment carrier and by applying the color composition to the surface of the transparent substrate such as a glass substrate such that the dry film thickness is 0.2 to 5 μm. Examples of the solvent include cyclohexanone, ethylcellosolve acetate, butylcellosolve acetate, 1-methoxy-2-propyl acetate, diethylene glycol dimethyl ether, ethylbenzene, ethylene glycol diethyl ether, xylene, ethylcellosolve, methyl-n-amyl ketone, propylene glycol monomethyl ether, toluene, methyl ethyl ketone, ethyl acetate, methanol, ethanol, isopropyl alcohol, butanol, isobutyl ketone and petroleum type solvents. These compounds are used either singly or in combinations.

The solvent may be used in an amount of 800 to 4000 parts by weight and preferably 1000 to 2500 part by weight based on 100 parts by weight of the pigment in the color composition.

The color composition may be produced by dispersing one or two or more types of pigments together with, as required, the above photoinitiator in the pigment carrier and an organic solvent by various dispersing means such as a three-roll mill, double-roll mill, sand mill, kneader and attritor.

Also, a color composition containing two or more types of pigments may be produced by mixing dispersion solutions obtained by finely dispersing each pigment separately in the pigment carrier and an organic solvent.

When the pigment is dispersed in the pigment carrier and an organic solvent, dispersion agents such as a resin type pigment dispersant, surfactant and pigment derivative may be contained.

The dispersion agent is superior in the dispersion of the pigment and has a large effect of preventing reaggregation of the pigment after the pigment is dispersed and therefore, a color filter having high transparency is obtained when a color composition obtained by using the dispersion agent to disperse the pigment in the pigment carrier and organic solvent is used. The dispersion agent may be used in an amount of 0.1 to 40 parts by weight and preferably 0.1 to 30 parts by weight based on 100 parts by weight of the pigment in the color composition.

The resin type pigment dispersant is a material which has a pigment affinitive part which adsorbs to the pigment by nature and a part compatible with the pigment carrier and works to adsorb to the pigment, thereby stabilizing the dispersion of the pigment in the pigment carrier.

As the resin type pigment dispersant, specifically, a polyurethane, polycarboxylate such as polyacrylate, unsaturated polyamide, polycarboxylic acid, amine (partial) polycarboxylate, ammonium polycarboxylate, alkylamine polycarboxylate, polysiloxane, long-chain polyaminoamide phosphate and hydroxyl group-containing polycarboxylate and modified products of these compounds, oily dispersants such as amides or their salts formed by a reaction of a poly(lower alkyleneimine) with a polyester having a free carboxyl group, (meth)acrylic acid/styrene copolymer, (meth)acrylic acid/(meth)acrylate copolymer, styrene/maleic acid copolymer, water-soluble resins and water-soluble polymer compounds such as polyvinyl alcohol and polyvinyl pyrrolidone, polyester type, modified polyacrylates, ethylene oxide/propylene oxide addition compound and phosphates are used. These compounds may be used either singly or as mixtures of two or more.

Examples of the surfactant include anionic surfactants such as polyoxyethylene alkyl ether sulfate, sodium dodecylbenzenesulfonate, alkali salt of styrene/acrylic acid copolymer, sodium alkylnaphthalenesulfonate, sodium alkyldiphenyl ether disulfonate, monoethanolamine laurylsulfate, triethanolamine laurylsulfate, ammonium laurylsulfate, monoethanolamine stearate, sodium stearate, sodium laurylsulfate, monoethanolamine of a styrene/acrylic acid copolymer and polyoxyethylene alkyl ether phosphate; nonionic surfactants such as polyoxyethylene oleyl ether, polyoxyethylene lauryl ether, polyoxyethylene nonylphenyl ether, polyoxyethylene alkyl ether phosphate, polyoxyethylenesorbitan monostearate and polyethylene glycol monolaurate; cationic surfactants such as alkyl quaternary ammonium salts and their ethylene oxide addition products; and amphoteric surfactants such as alkylbetaine of, for example, alkyldimethylaminoacetic acid betaine and alkylimidazoline. These compounds may be used either singly or by mixing two or more.

The dyestuff derivatives are compounds obtained by introducing a substituent into an organic dyestuff and are preferably those having a hue close to that of the pigment to be used. However, if the amount of the dyestuff derivative is small, a dyestuff derivative having a different color may be used.

The organic dyestuff includes aromatic polycyclic compounds having pale yellow such as a naphthalene type and anthraquinone type which are not usually called dyes.

As the dyestuff derivatives, those described in JP-A 63-305173, JP-A 57-15620, JP-A 59-40172, JP-A 63-17102, JP-A 5-9469 and the like may be used. Particularly, dyestuff derivatives having a basic group have a large effect on the dispersion of the pigment and are therefore used preferably. These dyestuff derivatives may be used either singly or by mixing two or more.

The color composition may contain a storage stabilizer to stabilize the viscosity of a composition with time. Examples of the storage stabilizer include benzyltrimethyl chloride, quaternary ammonium chlorides of, for example, diethylhydroxyamine, organic acids such as lactic acid and oxalic acid and their methyl ethers, organic phosphines such as t-butylpyrocatechol, tetraethylphosphine and tetraphenylphosphine and phosphites. The storage stabilizer may be contained in an amount of 0.1 to 10 parts by weight based on 100 parts by weight of the pigment in the color composition.

Also, the color composition may contain an adhesion improver such as a silane coupling agent to improve the adhesiveness to the substrate. Examples of the silane coupling agent include vinylsilanes such as vinyltris(β-methoxyethoxy)silane, vinylethoxysilane and vinyltrimethoxysilane, (meth)acrylsilanes such as γ-methacryloxypropyltrimethoxysilane, epoxysilanes such as β-(3,4-epoxycyclohexyl)ethyltrimethoxysilane, β-(3,4-epoxycyclohexyl)methyltrimethoxysilane, β-(3,4-epoxycyclohexyl) ethyltriethoxysilane, β-(3,4-epoxycyclohexyl) methyltriethoxysilane, γ-glycidoxypropyltrimethoxysilane and γ-glycidoxypropyltriethoxysilane, aminosilanes such as N-β(aminoethyl)γ-aminopropyltrimethoxysilane, N-β(aminoethyl)γ-aminopropyltriethoxysilane, N-β(aminoethyl)γ-aminopropylmethyldiethoxysilane, γ-aminopropyltriethoxysilane, γ-aminopropyltrimethoxysilane, N-phenyl-γ-aminopropyltrimethoxysilane and N-phenyl-γ-aminopropyltriethoxysilane and thiosilanes such as γ-mercaptopropyltrimethoxysilane and γ-mercaptopropyltriethoxysilane. The silane coupling agent may be contained in an amount of 0.01 to 100 parts by weight based on 100 parts by weight of the pigment in the color composition.

The color composition may be prepared in the forms of gravure offset printing ink, waterless offset printing ink, ink jet ink, silk screen printing ink, solvent developing type or alkali developing type color resist. The color resist is a material obtained by dispersing a dye in a composition containing a thermoplastic resin, thermo-setting resin or photosensitive resin, a monomer, a photoinitiator and an organic solvent.

The pigment is preferably contained in a ratio of 5 to 70% by weight based on the total solids (100% by weight) of the color composition. The pigment is more preferably contained in an amount of 20 to 50% by weight, and the balance consists essentially of a resinous binder which is a pigment carrier.

The color composition is preferably subjected to a separating means such as centrifugation, sintered filter and membrane filter to remove coarse particles having a size of 5 μm or more, preferably 1 μm or more and more preferably 0.5 μm or more and contaminated dust.

The red pixel, green pixel and blue pixel of the color filter are formed on a transparent substrate by using each of the above color compositions according to the printing method or photolithographic method.

As the transparent substrate, a glass plate such as soda lime glass, low-alkali borosilicate glass, or nonalkali aluminoborosilicate glass or resin plate such as polycarbonate, polymethylmethacrylate or polyethylene terephthalate are used. Also, a transparent electrode formed of a combination of metal oxides such as indium oxide, tin oxide, zinc oxide and antimony oxide may be formed on the surface of the glass plate or resin plate in order to drive a liquid crystal in a liquid crystal panel.

The formation of each color filter segment by using the printing method is achieved at low cost and is superior in productivity as the method of producing a color filter because patterning can be made merely by repeating printing and drying of the color compositions prepared as the various printing inks above. Further, current printing technologies make it possible to print a fine pattern having high dimensional accuracy and smoothness. In order to carry out printing, the color composition is preferably designed to have a composition which is neither dried nor solidified on the print precursor plate or blanket. Also, it is important to control the fluidity of ink on a printing machine and the viscosity of the ink can be regulated by a dispersant and an extender.

The ink jet method is a method of directly printing on a transparent substrate or a substrate on which active elements such as TFTs are formed by an ink jet machine provided with a plurality of fine nozzles (ink jet head) for each color.

In the case of forming each pixel by the photolithographic method, a color composition prepared as the above solvent developing type or an alkali developing type color resist is applied to a transparent substrate in a dry film thickness of 0.2 to 10 μm by a coating method such as the spray coating, spin coating, slit coating and roll coating.

When the coating film is dried, a vacuum drier, convection oven, IR oven or hot plate may be used. The film dried according to the need is exposed to ultraviolet rays through a mask having a specified pattern, the mask being disposed in contact with or in noncontact with the film.

After that, the coating film is dipped in a solvent or an alkali developing solution or a developing solution is sprayed on the coating film to remove the uncured part, thereby forming a desired pattern and then, the same operations are repeated for other colors, thereby making it possible to produce a color filter.

Moreover, in order to promote the polymerization of the color resist, the color resist may be heated according to the need.

According to the photolithographic method, a color filter having higher accuracy than in the case of using the above printing method can be produced.

In the developing, an aqueous solution of sodium carbonate or sodium hydroxide is used and an organic alkali such as dimethylbenzylamine or triethanolamine may also be used. Also, an antifoaming agent and a surfactant may be added to the developing solution. As the developing method, the shower developing method, spray developing method, dip developing method or paddle developing method may be applied.

In order to improve ultraviolet ray exposure sensitivity in this case, a method may be adopted in which the above color resist is applied and dried, then, a water-soluble or aqueous alkali-soluble resin, for example, a polyvinyl alcohol or water-soluble acryl resin is applied and dried to form a film which prevents polymerization inhibition caused by oxygen and then, the film is exposed to ultraviolet rays.

The color filter used preferably in the liquid crystal display device of the present embodiment may be produced using, other than the above methods, the electrodeposition method, transfer method, ink jet method or the like.

The electrodeposition method is a method for producing a color filter by utilizing a transparent conductive film formed on a transparent substrate to form each color filter segment on a transparent conductive film by the electrophoresis of colloidal particles. The transfer method is a method in which a color filter layer is formed in advance on the surface of a peelable transfer base sheet and then, this color filter layer is transferred to a desired transparent substrate.

Next, the liquid crystal display device according to the second embodiment of the present invention provided with the color filter according to the first embodiment of the present invention as mentioned above will be explained.

Figure 2:
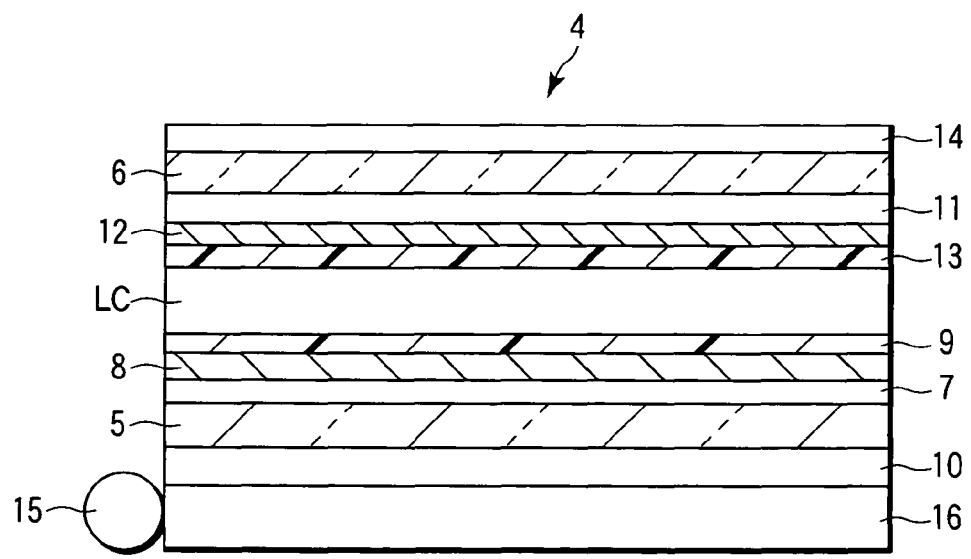
FIG. 2 is a schematic sectional view showing an example of a liquid crystal display device provided with a color filter according to an embodiment of the present invention.

FIG. 2 is a schematic sectional view of a liquid crystal display device according to this embodiment. A liquid crystal display device 4 shown in FIG. 2 is a typical example of a TFT drive type liquid crystal display device for use in liquid crystal TVs, and is provided with a pair of transparent substrates 5 and 6 arranged apart from each other with a liquid crystal (LC) interposed between the pair of transparent substrates.

The liquid crystal (LC) is aligned according to a liquid crystal alignment mode such as TN (Twisted Nematic), STN (Super Twisted Nematic), IPS (In-Plane switching), VA (Vertical Alignment), or OCB (Optically Compensated Birefringence).

A TFT (thin film transistor) array 7 is formed on the inside surface of the first transparent substrate 5 and a transparent electrode layer 8 constituted of, for example, ITO is formed on the TFT array 7. An alignment layer 9 is disposed on the transparent electrode layer 8. Also, a polarizing plate 10 including a retardation film in its structure is formed on the outside surface of the transparent substrate 5.

On the other hand, a color filter 11 of the present embodiment is formed on the inside surface of the second transparent substrate 6.

Red, green and blue filter segments constituting the color filter 11 are separated by black matrixes (not shown).

A transparent protective film (not shown) is formed according to the need to coat the color filter 11, a transparent electrode layer 12 constituted of, for example, ITO is formed on the transparent protective film and an alignment layer 13 is disposed to coat the transparent electrode layer 12. Also, a polarizing plate 14 is formed on the outside surface of the transparent substrate 6. Further, a backlight unit 16 provided with a three-wavelength lamp 15 is disposed below the polarizing plate 10.

Next, a method for producing the liquid crystal display device explained above will be explained.

Figure 3:
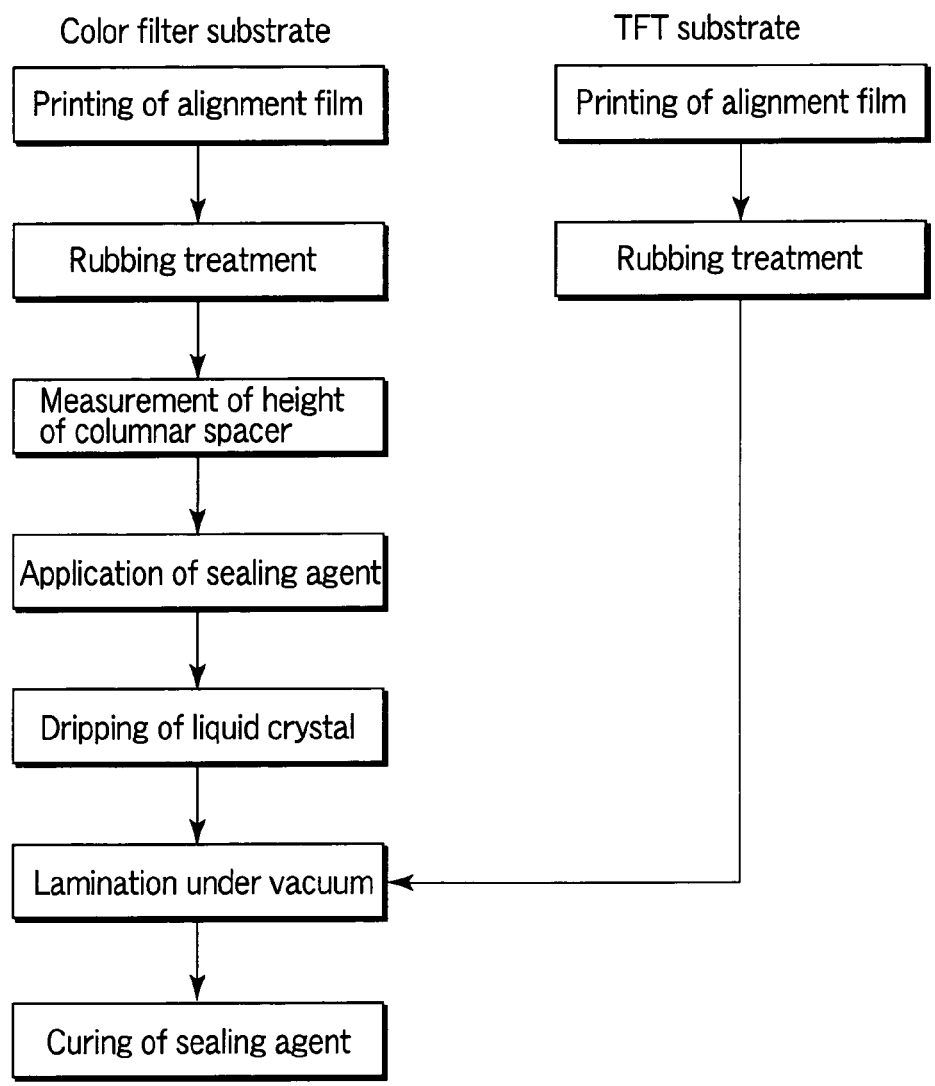
FIG. 3 is a flow chart showing a process for producing a liquid crystal display device.

FIG. 3 is a flow diagram for producing a liquid crystal display device according to the second embodiment of the present invention by using the color filter substrate according to the first embodiment of the present invention. In the production of the liquid crystal display device, it is first necessary to carry out an alignment treatment of the color filter substrate and array substrate as shown in FIG. 3. In the alignment treatment, such a process is carried out in which an alignment film is formed on the liquid crystal display device substrate on the side in contact with the liquid crystal and the liquid crystal molecules are evenly aligned at the liquid crystal interface of the liquid crystal display device substrate.

The alignment films 9 and 13 have such a nature that they align a liquid crystal in a specified direction and it is therefore necessary to select the alignment films according to the specified liquid crystal mode. As the material of the alignment film, a photosensitive or non-photosensitive material such as a polyimide type resin, polyamide type resin and polyvinyl alcohol type resin are preferably used, though the material of the alignment film is not limited to these materials. A polyimide type resin is however preferable from the viewpoint of the heat resistance and reliability of the alignment film.

The alignment film using a polyimide type resin is obtained by applying a soluble polyimide solution or polyamic acid solution on the liquid crystal display device substrate and then by drying, calcining or radiation with light according to the need. An alignment film material is formed on the liquid crystal display device substrate by, for example, flexo-printing, spin coating, roll coating, slit-die coating or ink jet printing. As the polyimide type resin preferably used as the alignment film, a material obtained by converting an imide from polyamic acid by heating or by using an appropriate catalyst is preferably used.

A commercially available alignment film may be used to attain the structure of the liquid crystal display device according to this embodiment. For example, products from JSR Corporation, for example, AL1000, AL1068, AL1072, AL1077, AL1F00, AL3000, AL4000, AL5000, AL6000, AL7000, AL8000, AL1H659, AL60101, AL60601, JALS-146, JALS-212, JALS-246, JALS-406, JALS-445, JALS-469, JALS-550, JALS-552, JALS-553, JALS-555, JALS-556, JALS-566, JALS-725, JALS-1082, JALS-1085 and JALS-1216, products from Chisso Corporation, for example, PIA-5140, PIA-5150, PIA-5310, PIA-X322, PIA-2024, PIA-2700, PIA-2800 and PIA-2900, and products from Nissan Chemical Industries Ltd., for example, SE-130, SE-150, SE-2110, SE-410, SE-610, SE-1180, SE-2170, SE-1211, SE1410, SE-3140, SE-3210, SE-3310, SE-3510, SE-5291, SE-5300, SE-6210, SE-7492, SE-7992, SE-7511L, SE-8192L, RN-1322, RN-1332, RN-1349, RN-1358, RN-1386, RN-1417, RN-1436, RN-1450, RN-1477, RN-1486 and the like may be used either independently or in combinations of two or more. Also, other polymer components may be optionally added or the resin components contained in these products may be optionally selected and used.

As the solvent to be used in the alignment film solution, water, alcohols such as ethanol, methanol, isobutanol and 3-methyl-3-methoxybutanol, ketones such as methyl ethyl ketone, methyl isobutyl ketone and cyclohexanone, ethers such as diethyl ether, isopropyl ether, tetrahydrofuran, dioxane, ethylene glycol dimethyl ether, ethylene glycol diethyl ether and diethylene glycol diethyl ether, esters such as ethyl acetate, n-butyl acetate, 3-methoxy-3-methylbutyl acetate, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, propylene glycol monomethyl ether acetate, propylene glycol monoethyl ether acetate and γ-butyrolactone, amides such as N,N-dimethylformamide and N,N-dimethylacetamide, pyrrolidones such as 2-pyrrolidone and N-methylpyrrolidone and butylcellosolve or the like may be used.

The treatment carried out to align the liquid crystal evenly at the liquid crystal interface is used in a liquid crystal display mode such as TN and IPS in which it is required to align the director of the liquid crystal close to the horizontal plane of the liquid crystal display device substrate. In this treatment, a rubbing treatment is used which uses a cloth such as rayon or cotton to rub the alignment film, or an optical alignment treatment in which light controlled in polarization is applied.

The thickness of the liquid crystal layer of the liquid crystal display device is maintained by a columnar spacer (not shown). The columnar spacer is formed by applying a photosensitive resin to a color filter substrate by the photographic method or the like.

For the measurement of the height of the columnar spacer, a noncontact type film thickness meter is preferably used in consideration of staining on the substrate and measuring accuracy though a wide range of film thickness measuring meters including contact type filth thickness measuring meters like a tracing type film thickness measuring meter and noncontact type film thickness measuring meters such as a light interferometer and laser microscope.

In the production of the liquid crystal display device, a photo-setting resin such as an acryl type resin and a thermo-setting resin such as an epoxy type resin may be used, or a resin mixture containing both the photo-setting resin and thermo-setting resin may be used as the sealing agent for fixing the liquid crystal between the pair of liquid crystal display substrates.

As the liquid crystal material used in the liquid crystal display device, an appropriate material may be optionally selected corresponding to the display mode and drive system without any particular limitation. As the nematic liquid crystal to be used in the present invention, those having a positive or negative dielectric anisotropy Δε depending on the display system may be properly used.

A commercially available liquid crystal may be used to attain the structure of the liquid crystal display device of this embodiment. Products from Merck & Co., Inc., such as MLC-6601, MLC-6614, MLC-6686, MLC-6692, MLC-6608, MLC-6609, MLC-6610, MLC-6222, MLC-6252, MLC-6256, MLC-6625 and MLC-6628 may be used.

A plunger pump type dispenser is used to drip the liquid crystal material on the liquid crystal display device substrate. The liquid crystal material dripping dispenser introduces the liquid crystal material into a cylinder casing and a lengthy rod-like plunger is moved in a vertical direction to thereby drip the liquid crystal from the nozzle. The drip amount of the liquid crystal material is controlled by the stroke of the plunger using a pump controller.

The pressure reduced when the pair of color filter substrates and array substrate are applied to each other is 1 Pa or less and preferably 0 Pa. When these substrates are applied to each other under a pressure exceeding 1 Pa, there may be case where the liquid crystal material is insufficiently spread and volatile gas is generated from, for example, the color filter material and liquid crystal material and remains in the liquid crystal cell, causing generation of air cells after the application is finished.

In the process of curing the sealing agent, the sealing agent is irradiated with ultraviolet light. In the UV irradiation, it is necessary for the light not to be applied to the display pixel part. After the sealing agent is irradiated with ultraviolet light, a heat treatment is usually carried out at 100 to 150° C. for 30 to 90 minutes. The sealing agent can be thermally cured by this heat treatment and also, the realignment of the liquid crystal material can be promoted by heating at a temperature above the phase transition temperature of the liquid crystal material. The liquid crystal display substrate obtained in this manner is cut and then, mounted with an IC, polarizing plate and backlight unit to thereby complete a liquid crystal display device.

The liquid crystal display device according to this embodiment may be provided with a retardation film as the optical compensation layer to obtain a wider viewing angle. As the retardation film, a stretched birefringence polymer film has been used so far. However, an optical compensation layer provided with an optical anisotropic layer formed of a low molecular or high molecular liquid crystal compound on a transparent support may be used in place of the optical compensation layer formed of a stretched birefringence polymer film, or an optical compensation layer provided with an optical anisotropic layer formed of a low molecular or high molecular liquid crystal compound besides the optical compensation layer formed of a stretched birefringence polymer film may be used. Also, this optical compensation layer may be formed inside of the liquid crystal cell.

The optical properties of the retardation film are determined corresponding to the optical properties of the liquid crystal cell, and specifically corresponding to a difference in display mode as mentioned above. For example, an IPS mode retardation film can compensate the viewing angle dependency of the polarizing plate to lower the luminance of black display over all angles, thereby making it possible to improve the viewing angle characteristics of contrast. Moreover, when the optical properties of the retardation film are designed to have optimum values for all wavelengths of light, a liquid crystal display device which is reduced in color variation and has wide viewing characteristics can be provided. It is particularly effective to combine this retardation film with a multi-gap or multi-domain. Also, a structure is possible in which the viewing angle is not widened but narrowed so as to enable the observation of display only from a specified direction.

Examples of a retardation film usable in the liquid crystal display device according to this embodiment include films provided with an optically anisotropic layer formed from a composition containing a liquid crystal compound, for example, rod-like liquid crystal molecules such as azomethines, azoxies, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles (see, for example, J. Chemistry General Remarks, vol 22, "CHEMISTRY OF LIQUID CRYSTALS" (1994) The Chemical Society of Japan, Chapter Nos. 4, 7 and 11, and "LIQUID CRYSTAL DEVICE HANDBOOK", Japan Society for the Promotion of Science, No. 142 Committee, Chapter No. 3), discotic liquid crystal compounds (see, for example, C. Destrade et al., Mol. Crysr. Liq. Cryst., vol. 71, page 111 (1981); J. Chemistry General Remarks, vol 22, "CHEMISTRY OF LIQUID CRYSTALS" The Chemical Society of Japan, Chapter No. 5 and No. 10-2 (17) (1994); B. Kohne et al., Angew. Chem. Soc. Chem. Comm., page 1794 (1985); J. Zhang et al., J. Am. Chem. Soc., vol. 116, page 2655 (1994)), or biaxial retardation films satisfying nx≧ny>nz. Non-liquid crystalline polymers are preferably used because they are superior in heat resistance, chemical resistance and transparency and are highly stiff.

Examples of the above polymer may include polymers such as polyamide, polyimide, polyester, polyether ketone, polyamideimide and polyesterimide and among these compounds, a polyimide is preferable from the viewpoint of high alignment and high transparency.

As the retardation film, commercially available products may also be used. Examples of these retardation films include "Zeonor" (trade name, manufactured by Zeon Corporation), "Arton" (trade name, manufactured by JSR Corporation), "N-TAC series" manufactured by Konica Minolta and "Fuji-TAC series" manufactured by FUJIFILM Corporation.

The first embodiment of the present invention ensures that even if there is the possibility that the retardation value in the thickness direction of the green pixel layer becomes negative from the reason that the type of pigment to be used is specified and the pigment is micronized with the intention of obtaining a color filter having a higher contrast, a color filter can be provided which has a retardation value which is positive and is adjusted to an optimum value so as to satisfy the equation (3) by selecting a pigment which can give a positive retardation value in the thickness direction, by carrying out micronizing treatment so as to obtain a positive retardation value and by adding microparticles which can adjust a positive retardation value in the thickness direction.

Also, according to the second embodiment of the present invention, a liquid crystal display device superior in the display of viewing angle from an oblique direction can be obtained when a liquid crystal display is produced using the color filter according to the first embodiment of the present invention so as to be adaptable to optical characteristics of the optical compensation layer and other structural members, and particularly, the characteristics of the wavelength dispersion of retardation, because there is no variation in the state of the polarization of the light passing through the display region of each color pixel.

Further, a black display for which the viewing angle from an oblique direction is compensated is obtained. Therefore, when the display is viewed from an oblique direction, it is reduced in color shift and also reproduces a neutral black color, so that it can develop very excellent display characteristics.

EXAMPLES

The present invention will be explained in detail by way of Examples, which, however, are not intended to be limiting of the present invention. Because the materials used in these examples include those very sensitive to light, it is necessary to prevent the material from being exposed to unnecessary light such as natural light and it is therefore needless to say that all operations are carried out under a yellow or red light lamp. In these examples, all designations of parts indicate parts by weight.

Also, the symbols of the pigments refer to color index numbers, and, for example, "PR254" represents "C.I. Pigment Red 254" and "PY150" represents "C.I. Pigment Yellow 150".

The dyestuff derivatives used in the following examples are shown in the following Table 1.

TABLE 1

| dyestuff derivatives | Chemical structure |
|---|---|
| D-1 | 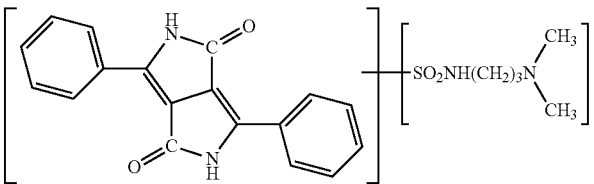 |

TABLE 1-continued

| dyestuff derivatives | Chemical structure |
|---|---|
| D-2 | (structure shown) |
| D-3 | (structure shown) |
| D-4 | [CuPc—SO$_2$NH(CH$_2$)$_3$N(C$_2$H$_5$)$_2$]<br>CuPc: Copper phthalocyanine residual group | a) Production of Micronized Pigments

The micronized pigments used in Examples and Comparative Examples were produced in the following method. Then, the average primary particle diameter of the obtained pigment was measured by a general method in which the size of a primary particle was directly measured from an electro-microphotograph.

Specifically, a transmission type electron microscope (trade name: JEM-2010, manufactured by JEOL Ltd.) was used to take a photograph of particles within a field of view, and then, the minor axis diameter and major axis diameter of each primary particle of individual pigments constituting an aggregate on the two-dimensional image were measured to calculate an average of these diameters as the particle diameter of the pigment particles.

Next, with regard to 100 or more pigment particles, the volume (weight) of each particle was determined by approximation of the obtained particle to a rectangular parallelopiped to calculate the volume average particles diameter as an average primary particle diameter. At this time, the above color composition which was the sample was ultrasonically dispersed in a solvent and then, a photograph of the particles was taken by the above electron microscope. In this case, the same effect is obtained by using any of a transmission type (TEM) and scanning type (SEM) electron microscope. The primary particle diameter mentioned here indicates a particle size (circle equivalent diameter) corresponding to a cumulative amount of 50% in the cumulative curve of a number-based particle size distribution.

Production Example 1

170 parts of tert-amyl alcohol was filled in a sulfonated flask under a nitrogen atmosphere. Then, 11.04 parts of sodium was added to the amyl alcohol and the mixture was heated to 92 to 102° C. Then, thus obtained sodium solution was kept overnight at 100 to 107° C., with vigorous stirring.

A solution obtained by dissolving 44.2 parts of 4-chlorobenzonitrile and 37.2 parts of diisopropylsuccinate in 50 parts of tert-amyl alcohol at 80° C. was introduced into the sodium solution at 80 to 98° C. over 2 hours. After the introduction of the solution, the reaction mixture was stirred at 80°

C. for 3 hours and at the same time, 4.88 parts of diisopropylsuccinate was added dropwise to the reaction mixture.

This reaction mixture was cooled to ambient temperature and then added to a 20° C. mixture of 270 parts of methanol, 200 parts of water and 48.1 parts of concentrated sulfuric acid, followed by stirring at 20° C. for 6 hours. The obtained red mixture was subjected to filtration, and the residue was washed with methanol and water and then dried at 80° C. to obtain 46.7 parts of a red pigment of diketopyrrolopyrrole (R-1).

Production Example 2

100 parts of a diketopyrrolopyrrole type red pigment PR254 (trade name: "Irgaphor Red B-CF"; R-1, manufactured by Ciba Speciality Chemicals Inc.), 18 parts of a dyestuff derivative (D-1), 1000 parts of milled common salt and 120 parts of diethylene glycol were charged in a 1-gallon stainless kneader (manufactured by INOUE MFG., INC.) and kneaded at about 60° C. for 10 hours.

This mixture was poured into 2000 parts of warm water and stirred by a high-speed mixer for about 1 hour with heating at about 80° C. to form a slurry-like material, which was then filtered and washed with water repeatedly to remove the common salt and solvent. Then, the obtained product was dried at 80° C. for 24 hours to obtain 115 parts of salt-milling treatment pigment (R-2). The primary particle diameter of the obtained pigment is shown in the following Table 2.

Production Example 3

100 parts of an anthraquinone type red pigment PR177 (trade name: "Chromophthal Red A2B", manufactured by Ciba Speciality Chemicals Inc.), 8 parts of a dyestuff derivative (D-2), 700 parts of milled common salt and 180 parts of diethylene glycol were charged in a 1-gallon stainless kneader (manufactured by INOUE MFG., INC.) and kneaded at about 70° C. for 4 hours.

This mixture was poured into 4000 parts of warm water and stirred by a high-speed mixer for about 1 hour with heating at about 80° C. to form a slurry-like material, which was then filtered and washed with water repeatedly to remove the common salt and solvent. Then, the obtained product was dried at 80° C. for 24 hours to obtain 102 parts of salt-milling treatment pigment (R-3). The primary particle diameter of the obtained pigment is shown in the following Table 2.

Production Example 4

120 parts of a halogenated copper phthalocyanine type green pigment PG36 (trade name: "LIONOL GREEN 6YK", manufactured by TOYO INK MFG., CO., LTD.), 1600 parts of milled common salt and 270 parts of diethylene glycol were charged in a 1-gallon stainless kneader (manufactured by INOUE MFG., INC.) and kneaded at about 70° C. for 12 hours.

This mixture was poured into 5000 parts of warm water and stirred by a high-speed mixer for about 1 hour with heating at about 70° C. to form a slurry-like material, which was then filtered and washed with water repeatedly to remove the common salt and solvent. Then, the obtained product was dried at 80° C. for 24 hours to obtain 117 parts of a salt-milling treatment pigment (G-1). The primary particle diameter of the obtained pigment is shown in the following Table 2.

Production Example 5

46 parts of zinc phthalocyanine was dissolved in 200° C. molten salt constituted of 356 parts of aluminum chloride and 6 parts of sodium chloride and the mixture was cooled to 130° C. and stirred for 1 hour. The reaction temperature was raised up to 180° C. and bromine was added dropwise to the mixture at a rate of 10 parts per hour for 10 hours. Then, chlorine was added to the mixture at a rate of 0.8 parts per hour for 5 hours.

This reaction solution was gradually poured into 3200 parts of water, which was filtered and washed with water to obtain 107.8 parts of a crude halogenated zinc phthalocyanine pigment. The average numbers of bromines and chlorines contained in one molecule of the crude halogenated zinc phthalocyanine pigment were 14.1 and 1.9 respectively.

120 parts of the obtained crude halogenated zinc phthalocyanine pigment, 1600 parts of milled common salt and 270 parts of diethylene glycol were charged in a 1-gallon stainless kneader (manufactured by INOUE MFG., INC.) and kneaded at about 70° C. for 12 hours.

This mixture was poured into 5000 parts of warm water and stirred by a high-speed mixer for about 1 hour with heating at about 70° C. to form a slurry-like material, which was then filtered and washed with water repeatedly to remove the common salt and solvent. Then, the obtained product was dried at 80° C. for 24 hours to obtain 117 parts of a salt-milling treatment pigment (G-2). The primary particle diameter of the obtained pigment is shown in the following Table 2.

Production Example 6

A separable flask was charged with 150 parts of water and further charged with 63 parts of 35% hydrochloric acid with stirring to prepare a hydrochloric acid solution. 38.7 parts of benzenesulfonylhydrazide was charged in the solution while taking care of foaming and then, ice was added until the temperature of the solution was dropped down to 0° C. or less. After the solution was cooled, 19 parts of sodium nitrite was charged over 30 minutes, followed by stirring at a temperature range from 0 to 15° C. for 30 minutes, and sulfamic acid was charged in the mixture until no coloration of a potassium iodide starch paper was proved.

Next, 25.6 parts of barbituric acid was added to the mixture, which was then raised up to 55° C. and stirred as it was for 2 hours. Then, 25.6 parts of barbituric acid was added to the mixture, which was then raised up to 80° C. and then, sodium hydroxide was poured into the solution until the pH of the solution was 5. The solution was further stirred at 80° C. for 3 hours and then, dropped to 70° C., followed by filtration and washing with water.

The obtained press cake was added in 1200 parts of warm water to reslurry and then, the slurry was stirred at 80° C. for 2 hours. Then, the slurry was filtered at this temperature and the residue was washed with 2000 parts of 80° C. warm water to confirm that benzenephonamide was transferred to the filtrate side. The obtained press cake was dried at 80° C. to obtain 61.0 parts of disodium azobarbiturate.

Then, 200 parts of water was charged in a separable flask into which 8.1 parts of the obtained disodium azobarbiturate powder was poured with stirring to disperse the powder. After the powder was uniformly dispersed, the solution was raised to 95° C. and 5.7 parts of melamine and 1.0 parts of diallylaminomelamine were added to the solution.

Moreover, a green solution obtained by dissolving 6.3 parts of cobalt (II) chloride hexahydrate in 30 parts of water was added dropwise to the solution over 30 minutes. After the addition was finished, the solution was complexed at 90° C. for 1.5 hours.

After that, the solution was adjusted to pH 5.5, and further, 20.4 parts of a solution put into an emulsion state by stirring 4 parts of xylene, 0.4 parts of sodium oleate and 16 parts of water in advance was added to the resulting solution, which was then further stirred under heating for 4 hours. After the reaction mixture was cooled down to 70° C., it was filtered rapidly and washed with 70° C. warm water repeatedly until inorganic salts were removed.

After that, 14 parts of an azo type yellow pigment (Y-2) was obtained through drying and milling processes. The primary particle diameter of the obtained pigment is shown in the following Table 2.

Production Example 7

160 parts of a yellow pigment (C.I. Pigment Yellow 138 (trade name: "PALIOTOL YELLOW KO961HD", manufactured by BASF SE), 1600 parts of sodium chloride and 270 parts of diethylene glycol (manufactured by TOKYO CHEMICAL INDUSTRY CO., LTD.) were charged in a 1-gallon stainless kneader (manufactured by INOUE MFG., INC.) and kneaded at about 60° C. for 15 hours.

Then, this mixture was poured into about 5 l of warm water and stirred by a high-speed mixer for about 1 hour with heating at about 70° C. to form a slurry-like material, which was then filtered and washed with water to remove sodium chloride and diethylene glycol. Then, the obtained product was dried at 80° C. for 24 hours to obtain 157 parts of a salt-milling treatment pigment (Y-3).

Production Example 8

100 parts of a copper phthalocyanine type blue pigment 15:6 (trade name: "LIONOL BLUE ES", manufactured by TOYO INK MFG., CO., LTD.), 800 parts of milled common salt and 100 parts of diethylene glycol were charged in a 1-gallon stainless kneader (manufactured by INOUE MFG., INC.) and kneaded at about 70° C. for 12 hours.

This mixture was poured into 3000 parts of warm water and stirred by a high-speed mixer for about 1 hour with heating at about 70° C. to form a slurry-like material, which was then filtered and washed with water repeatedly to remove the common salt and solvent. Then, the obtained product was dried at 80° C. for 24 hours to obtain 98 parts of a salt-milling treatment pigment (B-1). The primary particle diameter of the obtained pigment is shown in the following Table 2.

TABLE 2

| Colors | Symbols | Average primary particle diameter (nm) |
|---|---|---|
| RED | R-1 | 23.2 |
|  | R-2 | 24.8 |
|  | R-3 | 28.1 |
| GREEN | G-1 | 22.4 |
|  | G-2 | 24.3 |
| YELLOW | Y-1 | 99.5 |
|  | Y-2 | 25.2 |
|  | Y-3 | 31.2 |
| BLUE | B-1 | 28.3 |

A C.I. Pigment Yellow 150 (trade name: "FANCHON FAST YELLOW Y-5688", manufactured by BAYER AG) is called a yellow pigment 1.

b) Preparation of an Acryl Resin Solution 800 parts of cyclohexanone was charged in a reaction container and heated up to 100° C. while introducing nitrogen gas into the container and a mixture of the following monomer and heat polymerization initiator was added dropwise over 1 hour at the same temperature to allow a polymerization reaction to take place.

| | |
|---|---|
| Styrene | 70.0 parts |
| Methacrylic acid | 10.0 parts |
| Methylmethacrylate | 65.0 parts |
| Butylmethacrylate | 65.0 parts |
| Azobisisobutyronitrile | 10.0 parts |

After the addition was finished, the reaction mixture was further reacted at 100° C. for 3 hours and then, a solution obtained by dissolving 2.0 parts of azobisisobutyronitrile in 50 parts of cyclohexanone was added to the reaction mixture, and the reaction was continued at 100° C. for 1 hour to synthesize a resin solution.

After the reaction solution was cooled to ambient temperature, about 2 g of the resin solution was sampled and dried at 180° C. for 20 minutes to measure the content of nonvolatile components. Then, cyclohexanone was added to the previously synthesized resin solution such that the content of nonvolatile components was 20%, to prepare an acryl resin solution.

c) Preparation of a Pigment Dispersion

A mixture having the composition (ratio by weight) shown in the following Table 3 was uniformly mixed with stirring, dispersed using zirconia beads having a diameter of 1 mm in a sand mill for 5 hours and then subjected to filtration using a 5 µm filter, to obtain each color pigment dispersion.

TABLE 3

| Pigment dispersions | | RP-1 | RP-2 | RP-3 | GP-1 | GP-2 | GP-3 | GP-4 | BP-1 | BP-2 | BP-3 |
|---|---|---|---|---|---|---|---|---|---|---|---|
| Pigments | 1st pigment | R-1 | R-2 | R-3 | G-1 | G-2 | G-2 | G-2 | B-1 | B-1 | B-1 |
|  | 2nd pigment | R-3 | R-3 | R-3 | Y-1 | Y-2 | Y-2 | Y-2 | — | — | — |
| dyestuff derivatives | | D-1 | D-1 | D-1 | D-3 | D-3 | D-3 | D-3 | D-4 | D-4 | D-4 |
| Retardation-regulating agent | | — | — | Melamine | — | Melamine | Melamine | Melamine | — | Melamine | Melamine |
|  | | | | 30 | | 16.5 | 26.5 | 31.5 | | 30 | 40 |
| Composition | 1st pigment | 9.6 | 9.6 | 9.6 | 8.3 | 8.3 | 8.3 | 8.3 | 10 | 10 | 10 |
|  | 2nd pigment | 1.1 | 1.1 | 1.1 | 5.4 | 5.4 | 5.4 | 5.4 | — | — | — |
|  | dye stuff derivatives | 1.3 | 1.3 | 1.3 | 1.8 | 1.8 | 1.8 | 1.8 | 2 | 2 | 2 |
|  | Acrylic resin solution | 40 | 40 | 10 | 36.5 | 20 | 10 | 5 | 40 | 10 | — |
|  | Organic solvent | 48 | 48 | 48 | 48 | 48 | 48 | 48 | 48 | 48 | 48 |
|  | Total | 100 | 100 | 100 | 100 | 100 | 100 | 100 | 100 | 100 | 100 | d) Retardation Regulator

A melamine compound (trade name: "NIKALAC MX-750", Nippon Carbide Industries, Co., Inc.) and a styrene resin were used as retardation regulators. The styrene resin was prepared in the following manner.

432 g of propylene glycol monomethyl ether acetate and 13 g of azobisisobutyronitrile were added in a five-neck reaction container having an inside volume of 1 l and the mixture was heated to 80° C. while blowing nitrogen gas into the container. Then, a mixed solution of 86.3 g of styrene, 11.8 g of acrylic acid and 10.0 g of an EO-modified (meth)acrylate of paracumylphenol was added dropwise to the mixture over 2 hours. 6.5 g of azoisobutyronitrile was added to the mixture 30 minutes after the addition was finished, and the resulting mixture was heated further for 5 hours to obtain a styrene/acrylic acid copolymer. The obtained styrene/acrylic acid copolymer had a weight average molecular weight of 3000.

e) Preparation of a Color Composition (Hereinafter, Referred to as a Resist)

A mixture having the composition (ratio by weight) shown in the following Table 4 was uniformly mixed with stirring and then subjected to filtration using a 1 μm filter, to obtain each color resist.

Next, the color resist layer was developed by spraying a 23° C. aqueous sodium carbonate solution, then washed with ion exchange water and air-dried. Then, the substrate was post-baked at 230° C. for 30 minutes in a clean oven to obtain each color coating film. The film thickness of each of the dried coating films was 2.0 μm.

g) Measurement of Chromaticity, Spectral Transmittance, Retardation Value (in the Thickness Direction) and Contrast of Each Color Coating Film (Chromaticity, Spectral Transmittance)

The chromaticity in the XYZ colorimetric system chromaticity diagram was measured using a spectrophotometer (trade name: "OSP-2000", manufactured by OLYMPUS OPTICAL Co., LTD.).

The chromaticity of each coating film manufactured from each color resist shown in the above Table 4 is shown in the following Table 5.

(Retardation Value Rth in the Thickness Direction)

The retardation value in the thickness direction can be obtained in the following manner. A transmission type spectral ellipsometer (trade name: "M-220" manufactured by

TABLE 4

|  |  | RR-1 | RR-2 | RR-3 | RR-4 | RR-5 | RR-6 | PR-7 | GR-1 | GR-2 |
|---|---|---|---|---|---|---|---|---|---|---|
| Pigment dispersions |  | PR-1 36 | PR-2 36 | PR-3 36 | RP-3 36 | RP-1 36 | PR-1 36 | PR-1 36 | GP-1 45 | GP-2 45 |
| Retardation-regulating agent | Melamine | — | — | 12 | 6 | 3 | — | — | — | — |
|  | Stylene | — | — | — | — | — | 6 | 9 | — | — |
| Acrylic resin solution |  | 12 | 12 | — | 6 | 9 | 6 | 3 | 8 | 8 |
| Monomer |  | 4 | 4 | 4 | 4 | 4 | 4 | 4 | 4.8 | 4.8 |
| Photopolymirization initiator |  | 3.4 | 3.4 | 3.4 | 3.4 | 3.4 | 3.4 | 3.4 | 2.8 | 2.8 |
| Sensitizing agent |  | 0.4 | 0.4 | 0.4 | 0.4 | 0.4 | 0.4 | 0.4 | 0.2 | 0.2 |
| Organic solvent |  | 44.2 | 44.2 | 44.2 | 44.2 | 44.2 | 44.2 | 44.2 | 39.2 | 39.2 |
| Total |  | 100 | 100 | 100 | 100 | 100 | 100 | 100 | 100 | 100 |

|  |  | GR-3 | GR-4 | GR-5 | GR-6 | BR-1 | BR-2 | BR-3 | BR-4 | BR-5 |
|---|---|---|---|---|---|---|---|---|---|---|
| Pigment dispersions |  | GP-3 45 | GP-4 45 | GP-1 45 | GP-1 45 | BP-1 32 | BP-2 32 | BP-3 32 | BP-1 32 | BP-1 32 |
| Retardation-regulating agent | Melamine | 8 | 8 | 8 | — | — | 10 | 10 | 10 | — |
|  | Stylene | — | — | — | 5 | — | — | — | — | 7 |
| Acrylic resin solution |  | — | — | — | 3 | 10 | — | — | — | 3 |
| Monomer |  | 4.8 | 4.8 | 4.8 | 4.8 | 5.6 | 5.6 | 5.6 | 5.6 | 5.6 |
| Photopolymirization initiator |  | 2.8 | 2.8 | 2.8 | 2.8 | 2 | 2 | 2 | 2 | 2 |
| Sensitizing agent |  | 0.2 | 0.2 | 0.2 | 0.2 | 0.2 | 0.2 | 0.2 | 0.2 | 0.2 |
| Organic solvent |  | 39.2 | 39.2 | 39.2 | 39.2 | 50.2 | 50.2 | 50.2 | 50.2 | 50.2 |
| Total |  | 100 | 100 | 100 | 100 | 100 | 100 | 100 | 100 | 100 | f) Production of Each Color Coating Film

Each color resist shown in the above Table 4 was applied to a glass substrate by the spin coating method and then, prebaked at 70° C. for 20 minutes in a clean oven. Then, this substrate was cooled to ambient temperature, and then exposed to ultraviolet light from an extra-high pressure mercury lamp.

JASCO Corporation) was used to measure at wavelengths ranging from 400 nm to 700 nm in 5 nm increments from a direction inclined at an angle θ of 45 degrees with the direction of the normal line of the substrate on which the coating film was formed, to obtain d as an ellipso-parameter.

The retardation value $\Delta(\lambda)$ can be found from the following equation: $\Delta(l) = \delta/360 \times \lambda$. Using the value obtained by this equation, a three-dimensional refractive index was calculated to find the retardation value (Rth) in the direction from the following equation (4).

Although Rth at each wavelength could be found by the above measurements, a red pixel was measured at a wavelength of 610 nm, a green pixel was measured at a wavelength of 545 nm and a blue pixel was measured at a wavelength of 450 nm respectively to calculate the Rth in this evaluation.

$$Rth=\{(Nx+Ny)/2-Nz\}\times d \qquad (4)$$

In the formula, Nx is an in-plane refractive index in the direction of axis x of the color pixel layer, Ny is an in-plane refractive index in the direction of axis y of the color pixel layer and Nz is a refractive index in the thickness direction of the color pixel layer, with $Nx \geqq Ny$, x being called the slow axis, and d is the thickness (nm) of the color pixel layer.

The retardation value Rth in the thickness direction of each color coating film produced from each color resist shown in the above Table 4 is shown in the following Table 5.

(Contrast)

A polarizing plate was overlapped on each side of the substrate on which the coating film was formed and the ratio Lp/Lc of the luminance (Lp) when the polarizing plates are arranged in parallel to each other to the luminance (Lc) when the polarizing plates are arranged at right angles was calculated as the contrast (C).

Also, the contrast Lp/Lc of only the substrate with no color pixel was called CS, and the contrasts of a red pixel, a green pixel and a blue pixel were called CR, CG and CB respectively.

In this case, the luminance was measured by using a luminance colorimeter (trade name: "BM-5A", manufactured by Topcon Corporation) under the condition of a viewing angle of 2 degrees, and as the polarizing plate, "NPF-SEG1224DU" (trade name, manufactured by Nitto Denko Corporation) was used.

h) Production of a Color Filter

The color resists shown in the above Table 4 were combined to produce a color filter by the following method.

Example 1

First, a red resist (RR-2) was applied to a glass substrate on which a black matrix had been formed in advance by the spin coating method and then, prebaked at 70° C. for 20 minutes in a clean oven. Then, this substrate was cooled to ambient temperature and then exposed to ultraviolet light through a photomask by using an extra-high pressure mercury lamp.

After that, this substrate was developed by spraying a 23° C. aqueous sodium carbonate solution thereon, washed with ion exchange water and air-dried. Then, the substrate was post-baked at 230° C. for 30 minutes in a clean oven to form stripe red pixels.

Next, a green resist (GR-3) was used to form green pixels in the same manner, and furthermore, a blue resist (BR-2) was used to form blue pixels in the same manner, to obtain a color filter. The film thickness of each color pixel to be formed was 2.0 μm.

i) Production of a Liquid Crystal Display Device

An overcoat layer was formed on the obtained color filter and a polyimide alignment layer was formed on the overcoat layer by using Optomer AL60101 (trade name, manufactured by JSR Corporation).

A TFT array and a pixel electrode were formed on one surface of a separate (second) glass substrate and a polyimide alignment layer was formed on the TFT array and pixel electrode by using Optomer AL60101 (trade name, manufactured by JSR Corporation).

Two glass substrates prepared in this manner were made to face each other such that the electrode layers were disposed opposite to each other. The two substrates were registered with each other with keeping a fixed space between them by using spacer beads to seal the periphery of the opening for injecting a liquid crystal composition such that the opening remained unsealed. Next, a VA liquid crystal composition (trade name: "MLC-6610", manufactured by Merck & Co., Inc.) was injected from the opening and then, the opening was sealed.

Moreover, a polarizing plate (A) with a retardation plate was mounted on the manufactured liquid crystal display device, the polarizing plate being sampled as it was mounted with glass from an AQUOS series (trade name: "LC42-RX1W") commercially available liquid crystal television.

At this time, the optical parameters of each retardation plate to be sampled were as follows.

(Unit: nm)
(CF Side)
Re 450 nm: 55.2, 545 nm: 54.7, 610 nm: 54.5
Rth 450 nm: 108.6, 545 nm: 109.4, 610 nm: 109.8
(TFT Side)
Re 450 nm: 54.5, 545 nm: 55.0, 610 nm: 55.2
Rth 450 nm: 98.0, 545 nm: 105.7, 610 nm: 109.4

A backlight unit sampled from the above commercially available liquid crystal television was combined with the liquid crystal display device produced in this manner to obtain a VA display mode liquid crystal panel.

Example 2

A liquid crystal display device was obtained in the same manner as in Example 1 except that the red resist was changed from (RR-2) to (RR-1), the green resist was changed from (GR-3) to (GR-2), the blue resist was changed from (BR-2) to (BR-1) and the polarizing plate/retardation plate (A) was changed to the following (B).

Polarizing plate (B) with a retardation plate (trade name: (A-series) "LN52A610", manufactured by Samsung Electronics Co., Ltd.)
(CF Side)
Re 450 nm: 46.4, 545 nm: 48.6, 610 nm: 49.5
Rth 450 nm: 103.1, 545 nm: 106.4, 610 nm: 107.7
(TFT Side)
Re 450 nm: 46.1, 545 nm: 48.6, 610 nm: 49.8
Rth 450 nm: 93.9, 545 nm: 102.5, 610 nm: 106.7

Example 3

A liquid crystal display device was obtained in the same manner as in Example 1 except that the red resist was changed from (RR-2) to (RR-5), the green resist was changed from (GR-3) to (GR-2) and the blue resist was changed from (BR-2) to (BR-5).

Example 4

A liquid crystal display device was obtained in the same manner as in Example 1 except that the red resist was changed from (RR-2) to (RR-6), the green resist was changed from (GR-3) to (GR-2) and the blue resist was changed from (BR-2) to (BR-5).

Example 5

A liquid crystal display device was obtained in the same manner as in Example 1 except that the red resist was changed from (RR-2) to (RR-4), the green resist was changed from (GR-3) to (GR-4), the blue resist was changed from (BR-2) to (BR-3) and the polarizing plate/retardation plate (A) was changed to the following (B).

Example 6

A liquid crystal display device was obtained in the same manner as in Example 1 except that the red resist was changed from (RR-2) to (RR-7), the green resist was changed from (GR-3) to (GR-2), the blue resist was changed from (BR-2) to (BR-4) and the polarizing plate/retardation plate (A) was changed to the following (B).

Comparative Example 1

A liquid crystal display device was obtained in the same manner as in Example 2 except that the green resist was changed from (GR-2) to (GR-1).

Comparative Example 2

A liquid crystal display device was obtained in the same manner as in Example 2 except that the red resist was changed from (RR-1) to (RR-3).

Comparative Example 3

A liquid crystal display device was obtained in the same manner as in Example 1 except that the red resist was changed from (RR-2) to (RR-6), the green resist was changed from (GR-3) to (GR-6), the blue resist was changed from (BR-2) to (BR-5) and the polarizing plate/retardation plate (A) was changed to the following (B).

Comparative Example 4

A liquid crystal display device was obtained in the same manner as in Example 1 except that the red resist was changed from (RR-2) to (RR-6), the green resist was changed from (GR-3) to (GR-5), the blue resist was changed from (BR-2) to (BR-5) and the polarizing plate/retardation plate (A) was changed to the following (B).

j) Evaluation of Visibility in the Black State on the Liquid Crystal Display Device In the black state or OFF state in the liquid crystal display device, the quantity of the light (orthogonal transmission light: leaked light) leaked from the direction of the normal line (almost vertical direction) of the liquid crystal panel and from a direction (oblique direction) inclined at 45 degrees with the normal line was visually observed. Chromaticity $(u(\perp), v(\perp))$ as viewed from an approximate vertical direction and chromaticity $(u(45), v(45))$ as viewed from a direction inclined at a maximum angle of 60 degrees with the direction of the normal line of the display surface in the black state were measured by BM-5A (trade mark, manufactured by Topcon Corporation), to calculate the color difference $\Delta u'v'$, thereby finding the maximum $\Delta u'v'$ in a range of $\theta$: $0 \leq \theta \leq 60$ degrees. Rank assessments are as follows and the results are shown in the following Table 5.

In the following Table 5, the evaluation standards of the front visibility and oblique visibility are as follows.

Front Visibility

○: Even a dark image is clearly observed (=high contrast)

X: A dark image is not observed (=low contrast)

Oblique Visibility

○: $\Delta u'v' \leq 0.02$

X: $\Delta u'v' > 0.02$

TABLE 5

| | Resist | | | Color filter Rth | | | | Equation (○: satisfied X: unsatisfied) | | Visibility of liquid crystal display device at black display | | |
|---|---|---|---|---|---|---|---|---|---|---|---|---|
| | Red | Green | Blue | R | G | B | *1 | (2) | (3) | $\Delta u'v'$ | Front | Oblique |
| Ex. 1 | RR-2 | GR-3 | BR-2 | 40 | 50 | 30 | (A) | ○ | ○ | 0.014 | ○ | ○ |
| Ex. 2 | RR-1 | GR-2 | BR-1 | 20 | 30 | 10 | (B) | ○ | ○ | 0.014 | ○ | ○ |
| Ex. 3 | RR-5 | GR-2 | BR-5 | 25 | 30 | 5 | (A) | ○ | ○ | 0.016 | ○ | ○ |
| Ex. 4 | RR-6 | GR-2 | BR-5 | 13 | 30 | 5 | (A) | ○ | ○ | 0.013 | ○ | ○ |
| Ex. 5 | RR-4 | GR-4 | BR-3 | 60 | 70 | 40 | (B) | ○ | ○ | 0.020 | ○ | ○ |
| Ex. 6 | RR-7 | GR-2 | BR-4 | 6 | 30 | 25 | (B) | ○ | ○ | 0.016 | ○ | ○ |
| Comp. Ex. 1 | RR-1 | GR-1 | BR-1 | 20 | −10 | 10 | (A) | X | X | 0.068 | X | X |
| Comp. Ex. 2 | RR-3 | GR-2 | BR-1 | 80 | 30 | 10 | (A) | ○ | X | 0.021 | ○ | X |
| Comp. Ex. 3 | RR-6 | GR-6 | BR-5 | 13 | −15 | 5 | (B) | X | X | 0.077 | X | X |
| Comp. Ex. 4 | RR-6 | GR-6 | BR-5 | 13 | 5 | 5 | (B) | ○ | X | 0.050 | ○ | X |

*1: Polarizing plate/retardation plate
$\Delta u'v'$: MAX in a range of $\theta$: $0° \leq \theta \leq 60°$ It is understood from the above Table 5 that the color filters according to Examples 1 to 6 are formed such that the retardation values of the red, green and blue pixel layers in the thickness direction satisfy the above equations (2) and (3) and therefore the use of each of these color filters enables the production of a liquid crystal display device which satisfies the above equation (1) relative to the difference between chromaticities in the direction of the normal line and in an oblique direction of the display surface, and it is found that a liquid crystal display device having high visibility from the oblique direction is obtained.

Also, it is found that in a liquid crystal display device provided with a color filter according to Examples 1 to 6, the contrast at a front side is improved and therefore a liquid crystal display device having high visibility even from the front is obtained.

In a liquid display device provided with each of the color filters according to Comparative Examples 1 to 4, on the contrary, each color filter is not formed such that the retardation values of the red, green and blue pixel layers in the direction of each thickness satisfy both of the above equations (2) and (3), so that the retardation values of the red, green and blue pixels in the direction of each thickness are not well-balanced, causing a color shift in an oblique direction, bringing about inferior visibility.

What is claimed is:

1. A color filter for a liquid crystal display device, the liquid crystal display device having a liquid crystal cell provided with the color filter, a pair of polarizing plates arranged on both outside surfaces of the liquid crystal cell, and an optical compensation layer disposed inside of each polarizing plate, wherein, when a chromaticity (u, v) represented in CIE1960 color system is measured in a black state of the liquid crystal display device, a color difference $\Delta uv$ given by equation (1) described below is 0.02 or less in an range of $0<\theta\leq 60$:

$$\Delta uv = [\{u(\perp)-u(\theta)\}^2 + \{v(\perp)-v(\theta)\}^2]^{1/2} \quad (1)$$

where $(u(\perp), v(\perp))$ is chromaticity as viewed from a vertical direction and $(u(\theta), v(\theta))$ is chromaticity as viewed from a direction inclined at an angle of $\theta$ degrees with a direction of a normal line of a display surface, the color filter comprising:
color pixels including at least a red pixel, a green pixel and a blue pixel, wherein a retardation value Rth (R) in a thickness direction of the red pixel, a retardation value Rth (G) in a thickness direction of the green pixel and a retardation value Rth (B) in a thickness direction of the blue pixel satisfy following equations (2) and (3):

$$Rth(G) \geq 0 \quad (2)$$

$$Rth(B) < Rth(G) > Rth(R) \quad (3)$$

where Rth (R), Rth (G) and Rth (B) are a product of a value obtained by subtracting a refractive index in the thickness direction from an average of an in-plane refractive index of each pixel and a thickness (nm) of the pixel,
Rth (R) being a retardation value in the thickness direction with respect to a light at a wavelength of 610 nm passing through a red region,
Rth (G) being a retardation value in the thickness direction with respect to a light at a wavelength of 545 nm passing through a green region, and
Rth (B) being a retardation value in the thickness direction with respect to a light at a wavelength of 450 nm passing through a blue region.

2. The color filter according to claim 1, wherein the color pixels respectively is formed of a photosensitive color composition containing a retardation regulator.

3. The color filter according to claim 1, wherein the green pixel contains a zinc phthalocyanine pigment.

4. The color filter according to claim 2, wherein the retardation regulator has at least one plane structural group having at least one crosslinking group.

5. The color filter according to claim 1, wherein the retardation regulator is an acryl resin containing 70 to 90 mol % of at least one aromatic-containing monomer.

* * * * *